(12) United States Patent
Haga et al.

(10) Patent No.: US 11,539,727 B2
(45) Date of Patent: Dec. 27, 2022

(54) ABNORMALITY DETECTION APPARATUS AND ABNORMALITY DETECTION METHOD

(71) Applicant: Panasonic Intellectual Property Corporation of America, Torrance, CA (US)

(72) Inventors: Tomoyuki Haga, Nara (JP); Masato Tanabe, Kanagawa (JP); Yuishi Torisaki, Osaka (JP); Hiroyasu Terazawa, Osaka (JP); Ryo Kato, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 466 days.

(21) Appl. No.: 16/730,977

(22) Filed: Dec. 30, 2019

(65) Prior Publication Data

US 2020/0137099 A1    Apr. 30, 2020

Related U.S. Application Data

(63) Continuation of application No. PCT/JP2018/027012, filed on Jul. 19, 2018.

(30) Foreign Application Priority Data

Jul. 26, 2017 (JP) .............................. JP2017-144490
May 21, 2018 (JP) .............................. JP2018-097207

(51) Int. Cl.
*H04L 9/40* (2022.01)
*H04L 12/40* (2006.01)

(52) U.S. Cl.
CPC .... *H04L 63/1425* (2013.01); *H04L 12/40026* (2013.01); *H04L 63/1416* (2013.01);
(Continued)

(58) Field of Classification Search
CPC ............... H04L 63/14; H04L 12/40026; H04L 2012/40215; H04L 2012/4026; H04L 2012/40273
See application file for complete search history.

(56) References Cited

U.S. PATENT DOCUMENTS

2015/0172298 A1*  6/2015  Otsuka .................... H04L 63/08
                                                    726/30
2015/0229741 A1   8/2015  Kim et al.
(Continued)

FOREIGN PATENT DOCUMENTS

EP       3113529 A1    1/2017
JP       2012-006446   1/2012
(Continued)

OTHER PUBLICATIONS

The Extended European Search Report dated Apr. 29, 2020 for the related European Patent Application No. 18837632.1.
(Continued)

*Primary Examiner* — Kent Krueger
(74) *Attorney, Agent, or Firm* — Greenblum & Bernstein, P.L.C.

(57) ABSTRACT

An abnormality detection apparatus for a mobility entity and for detecting an abnormality in a network system is provided. The network system includes a first network and a second network that use different communication protocols. A first communication circuit receives state information indicating a state of the mobility entity. The state information is acquired from the second network. A second communication circuit transmits and receives a first frame according to a communication protocol used in the first network. A memory stores an abnormality detection rule. A processor detects, based on the state information and the abnormality detection rule, whether a control command included in the first frame received by the second commu- (Continued)

nication circuit is abnormal. In a case where the control command is abnormal, the processor prohibits the control command from being transmitted.

11 Claims, 17 Drawing Sheets

(52) U.S. Cl.
CPC ............... *H04L 2012/4026* (2013.01); *H04L 2012/40215* (2013.01); *H04L 2012/40273* (2013.01)

(56) References Cited

U.S. PATENT DOCUMENTS

| | | | | |
|---|---|---|---|---|
| 2015/0358351 | A1* | 12/2015 | Otsuka | H04L 12/4625 726/23 |
| 2016/0255154 | A1* | 9/2016 | Kim | H04L 63/08 726/25 |
| 2017/0093866 | A1* | 3/2017 | Ben-Noon | H04W 12/069 |
| 2018/0204011 | A1 | 7/2018 | Nakano et al. | |
| 2018/0302422 | A1 | 10/2018 | Kishikawa et al. | |
| 2019/0253272 | A1* | 8/2019 | Kolbus | H04L 12/40169 |
| 2019/0394089 | A1* | 12/2019 | Barrett | H04W 12/088 |

FOREIGN PATENT DOCUMENTS

| | | |
|---|---|---|
| JP | 2015-067187 | 4/2015 |
| JP | 2016-074317 | 5/2016 |
| JP | 2017-112598 A | 6/2017 |
| WO | 2017/119027 | 7/2017 |

OTHER PUBLICATIONS

International Search Report of PCT application No. PCT/JP2018/027012 dated Sep. 25, 2018.

* cited by examiner

FIG. 2A

| SOF | ID FIELD | RTR | IDE | r | DLC | DATA FILED | CRC | DEL | ACK | DEL | EOF |
|---|---|---|---|---|---|---|---|---|---|---|---|
| 1 | 11 | 1 | 1 | 1 | 4 | 0 TO 64 | 15 | 1 | 1 | 1 | 7 |

FIG. 2B

| SOF | ID FIELD | SRR | IDE | EXTENDED ID | RTR | r1 | r0 | DLC | DATA FILED | CRC |
|---|---|---|---|---|---|---|---|---|---|---|
| 1 | 11 | 1 | 1 | 18 | 1 | 1 | 1 | 4 | 0 TO 512 | 17/21 |

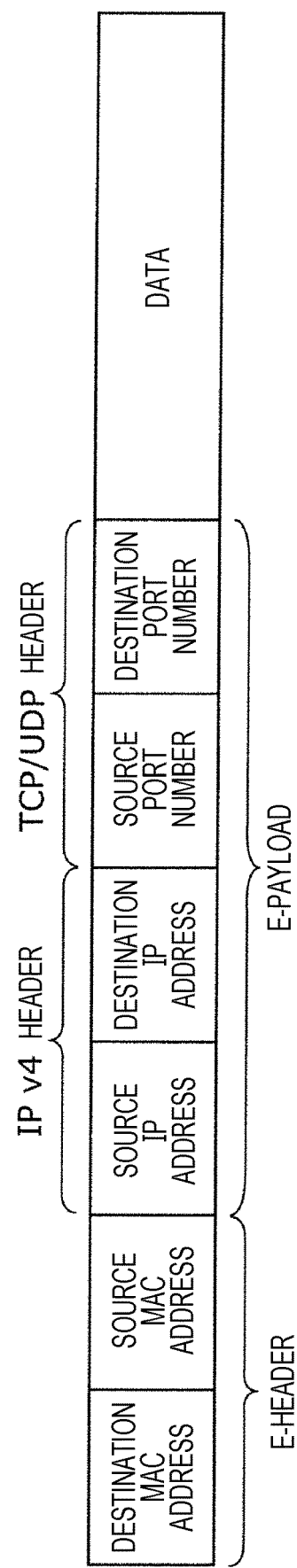

FIG. 8

| INPUT PORT | SOURCE IP ADDRESS | SOURCE MAC ADDRESS | OUTPUT PORT | DESTINATION IP ADDRESS | DESTINATION MAC ADDRESS |
|---|---|---|---|---|---|
| P1 | CAN GATEWAY | CENTRAL GATEWAY | P5 | AUTOMATED DRIVING ECU | AUTOMATED DRIVING ECU |
| P2 | CAMERA | CAMERA | P5 | AUTOMATED DRIVING ECU | AUTOMATED DRIVING ECU |
| P3 | LIDAR | LIDAR | P5 | AUTOMATED DRIVING ECU | AUTOMATED DRIVING ECU |
| P4 | DYNAMIC MAP ECU | DYNAMIC MAP ECU | P5 | AUTOMATED DRIVING ECU | AUTOMATED DRIVING ECU |
| P5 | AUTOMATED DRIVING ECU | AUTOMATED DRIVING ECU | P1 | CAN GATEWAY | CENTRAL GATEWAY |
| P2 | CAMERA | CAMERA | P1 | IVI | INFOTAINMENT DCU |
| P4 | DYNAMIC MAP | DYNAMIC MAP | P1 | MAP SERVER | CENTRAL GATEWAY |
| P3 | CAMERA | CAMERA | P1 | MAP SERVER | CENTRAL GATEWAY |
| – | AUTOMATED DRIVING DCU | AUTOMATED DRIVING DCU | P1 | MONITORING SERVER | CENTRAL GATEWAY |

FIG. 9

| VEHICLE SPEED STATE | SHIFT STATE | VEHICLE SPEED INSTRUCTION | STEERING INSTRUCTION |
|---|---|---|---|
| LOW SPEED | D | ⊿10 km | ⊿360 DEGREES |
| MIDDLE SPEED | D | ⊿20 km | ⊿180 DEGREES |
| HIGH SPEED | D | ⊿30 km | ⊿90 DEGREES |

FIG. 13

| CAN-ID | PERIOD | MARGIN OF PERIOD | AMOUNT OF CHANGE IN DATA VALUE |
|---|---|---|---|
| 0xA1 | 10 ms | ±3 ms | ±50 |
| 0xA2 | 20 ms | ±5 ms | ±100 |
| 0xA3 | 30 ms | ±10 ms | ±200 |

FIG. 17

| RULE #1 | CHECK PERIOD |
|---|---|
| RULE #2 | CHECK AMOUNT OF CHANGE IN DATA |
| RULE #3 | CHECK MAC |

ABNORMALITY DETECTION APPARATUS AND ABNORMALITY DETECTION METHOD

BACKGROUND

1. Technical Field

The present disclosure relates to an abnormality detection apparatus configured to detect an abnormality in a network system installed in a mobility entity, and an abnormality detection method.

2. Description of the Related Art

Japanese Unexamined Patent Application Publication No. 2012-6446 discloses an in-vehicle network system for controlling a vehicle.

SUMMARY

In the network system installed in a mobility entity such as a vehicle according to the technique disclosed in Japanese Unexamined Patent Application Publication No. 2012-6446, there is a possibility that it is difficult to properly detect an abnormality.

One non-limiting and exemplary embodiment provides an abnormality detection apparatus and an abnormality detection method capable of effectively detecting an abnormality in a network system installed in a mobility entity.

In one general aspect, the techniques disclosed here feature an abnormality detection apparatus that is for a mobility entity and for detecting an abnormality in a network system. The network system includes a first network and a second network that use different communication protocols. The abnormality detection apparatus includes a first communication circuit that receives state information indicating a state of the mobility entity. The state information is acquired from the second network. A second communication circuit transmits and receives a first frame according to a communication protocol used in the first network. A memory stores an abnormality detection rule. A processor, in operation, performs operations including: detecting, based on the state information and the abnormality detection rule, whether a control command included in the first frame received by the second communication circuit is abnormal; and, in a case where the processor detects that the control command is abnormal, prohibiting the control command from being transmitted.

According to the abnormality detection apparatus and the abnormality detection method of the present disclosure, it is possible to effectively detect an abnormality in a network system installed in a mobility entity.

It should be noted that general or specific embodiments may be implemented as a system, a method, an integrated circuit, a computer program, a computer-readable storage medium such as a CD-ROM disk, or any selective combination of a system, a method, an integrated circuit, a computer program, and a storage medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 2A and 2B are diagrams each illustrating a format of a data frame (CAN frame) transmitted/received in a second network;

FIG. 3 is a diagram illustrating a format of an E-frame transmitted/received in a first network;

FIG. 8 is a diagram illustrating an example of a switch rule stored in a switch rule storage;

FIG. 9 is a diagram illustrating an example of an abnormality detection rule stored in an abnormality detection rule storage of an automated driving DCU according to the first embodiment;

FIG. 13 is a diagram illustrating an example of an abnormality detection rule stored in an abnormality detection rule storage of an automated driving DCU according to the second embodiment;

FIG. 17 is a diagram illustrating a table defining a detection rule in detecting a CAN abnormality in an automated driving DCU according to the third embodiment.

DETAILED DESCRIPTION

Figure 1:
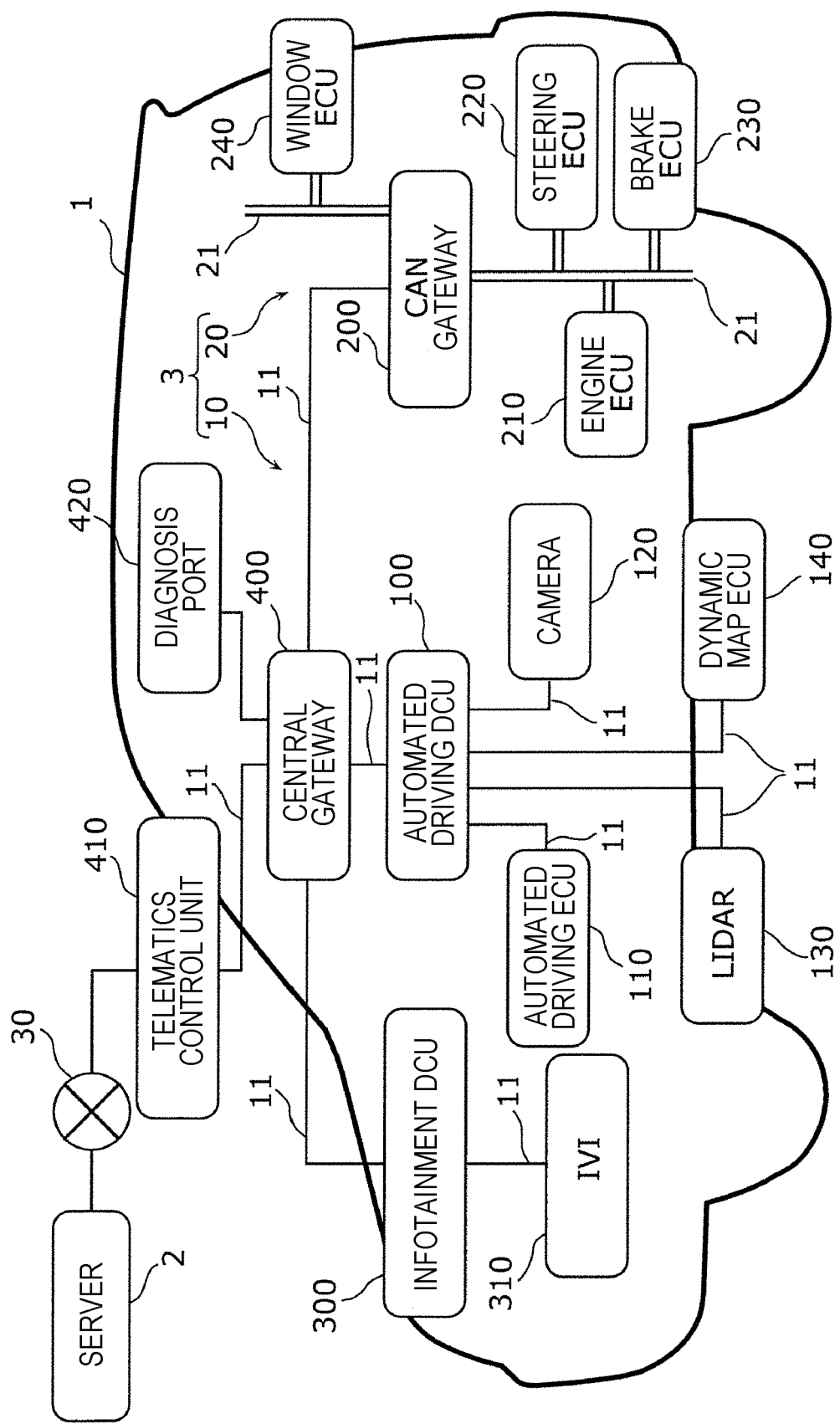
FIG. 1 is a schematic diagram illustrating an overall configuration of an in-vehicle network according to a first embodiment.

Underlying Knowledge Forming Basis of the Present Disclosure The present inventor has found that a problem described below occurs in an in-vehicle network system described above in "2. Description of the Related Art".

In a recent system in a vehicle, many apparatuses called electronic control units (ECU) are installed. A network connecting these ECUs to each other is called an in-vehicle network. There are many standards for in-vehicle networks. Among all, the CAN (Controller Area Network) standard defined in ISO 11898-1 is one of the most widely used in-vehicle networks. Ethernet (registered trademark) is a standard defined in IEEE802.3 for use in transmitting a larger amount of information.

In advanced driver assistance systems or automated driving systems, it is necessary to process a huge amount of information such as data acquired via a sensor such as a camera or LIDAR (Light Detection and Ranging) or data used in a dynamic map, and thus Ethernet (registered trademark) is widely used to achieve a high data transmission rate. On the other hand, a conventional CAN system is also used in vehicle control systems. This causes a mixture of CAN and Ethernet (registered trademark) to be employed in increasingly more in-vehicle network architectures.

In many cases, vehicles are connected to an external network and controlled electronically. This results in a risk that a vehicle is illegally operated by a forged vehicle control command. To prevent such a risk, in the technique disclosed in Japanese Unexamined Patent Application Publication No. 2012-6446 when an add-on electronic control apparatus tries to transmit data to a vehicle control network in an in-vehicle network system, a determination is performed as to whether the data transmitted to an information network in the in-vehicle network is to be allowed to be transferred to the vehicle control network. However, in the technique disclosed in Japanese Unexamined Patent Application Publication No. 2012-6446, the determination as to whether transfer is allowed or not is not based on information flowing on a plurality of different communication protocols. Thus the technique has a problem that it is impossible to properly make the determination as to whether transfer is to be allowed in a situation in which data is going to be transferred between a plurality of networks using different communication protocols, for example, such as CAN and Ethernet (registered trademark) protocols.

The present inventors have achieved, via extensive investigation, an abnormality detection apparatus and an abnormality detection method capable of determining whether a vehicle control message is invalid or not based on information flowing on a plurality of different protocols, thereby realizing a high-security automated driving system or advanced driver assistance system.

In an aspect, the present disclosure provides an abnormality detection apparatus that is for a mobility entity and for detecting an abnormality in a network system. The network system includes a first network and a second network that use different communication protocols. The abnormality detection apparatus includes a first communication circuit that receives state information indicating a state of the mobility entity. The state information is acquired from the second network. A second communication circuit transmits and receives a first frame according to a communication protocol used in the first network. A memory stores an abnormality detection rule. A processor, in operation, performs operations including: detecting, based on the state information and the abnormality detection rule, whether a control command included in the first frame received by the second communication circuit is abnormal; and, in a case where the processor detects that the control command is abnormal, prohibiting the control command from being transmitted.

Thus, the abnormality detection apparatus detects whether the generated automated driving control command is abnormal or not, based on the abnormality detection rule and the state information associated with the mobility entity acquired from the second network. This makes it possible to effectively detect an abnormality in the network system installed in the mobility entity.

The abnormality detection apparatus prohibits transferring of a control command detected to be abnormal. Thus, even in a case where, for example, a device connected to the first network has a vulnerability and the device is attacked via the first network, the abnormality detection apparatus is capable of preventing automated driving from being controlled unauthorizedly. When an abnormality is detected, it is possible to prevent a vehicle control command in automated driving or advanced driving system from being executed.

In the abnormality detection apparatus, the abnormality detection rule may includes a first rule indicating a control command allowed in each of a plurality of different states of the mobility entity, and the operations may further include, in a second case where the state of the mobility entity indicated by the state information is not included in any one of the plurality of states, for which the first rule indicates the allowed control command, detecting that the control command is abnormal.

This makes it possible for the abnormality detection apparatus to detect an abnormality of a vehicle control command based on a vehicle state in terms of, for example, a current vehicle speed, a steering angle state, a shift position, and/or the like.

The control command may cause the mobility entity to execute at least one of moving forward, turning, and stopping.

This makes it possible for the abnormality detection apparatus to detect an abnormality in automated driving or an advanced driver assistance system such as abrupt steering during running, sudden braking, sudden accelerating, jump starting from a stop state, or the like thereby providing a high-security driving environment.

In the abnormality detection apparatus, the first network may be according to Ethernet (registered trademark) protocol, the second network may be according to CAN protocol, the first communication circuit may receive the state information by receiving a CAN frame including the state information, the abnormality detection rule may include a first rule for detecting whether the CAN frame is abnormal, and the operations may further include, in a second case where the processor detects that the CAN frame is abnormal, prohibiting the control command from being transmitted.

Thus, after the CAN frame abnormality detection process is performed, it is allowed to execute a control command.

In the abnormality detection apparatus, the first network may be according to Ethernet (registered trademark) protocol, the second network may be according to CAN protocol, and the first communication circuit may receive an Ethernet (registered trademark) frame in which a CAN frame indicating the state information is included.

Thus, a CAN frame indicating state information is stored in an Ethernet (registered trademark) frame, and it is possible to detect, by a device on Ethernet (registered trademark), an abnormality of a CAN frame.

In the abnormality detection apparatus, the Ethernet frame may include a plurality of CAN frames, with the plurality of CAN frames including the CAN frame indicating the state information. The abnormality detection rule may include a first rule for detecting whether each of the plurality of CAN frames is abnormal. The plurality of CAN frames may include identifiers that are different depending on frame type. The first rule may indicate allowable CAN frame reception period ranges corresponding to the respective identifiers. The operations may further include: detecting an abnormality based on reception times corresponding to CAN frames having a same identifier such that, in a second case where a difference between a first reception time of a first CAN frame of the plurality of CAN frames and a second reception time of a second CAN frame of the plurality of CAN frames received one frame before the first CAN frame is out of an associated allowable CAN frame reception period range indicated by the first rule, the first CAN frame is abnormal.

Thus, even in a situation in which there is an abnormality on the second network, an abnormality of a CAN frame having periodicity can be detected at a device on the first network, and it is possible to safely stop the automated driving or the advanced driver assistance system.

In the abnormality detection apparatus, the first rule may further indicate allowable amounts of change corresponding to the identifiers, with the allowable amounts of change being determined from a data value of a CAN frame immediately previous to a current CAN frame. The operations may further include: detecting an abnormality such that, in a third case where a difference of a first data value of the first CAN frame from a second data value of the second CAN frame is greater than an associated allowable amount of change indicated by the first rule, the first CAN frame is abnormal.

Thus, in the abnormality detection apparatus, even in a situation in which there is an abnormality on the second network, an abnormality of a data value of a CAN frame can be detected at a device on the first network, and it is possible to stop the automated driving.

In the abnormality detection apparatus, the Ethernet frame may include a plurality of CAN frames, with the plurality of CAN frames including the CAN frame indicating the state information. The abnormality detection rule may include a first rule for detecting whether each of the plurality of CAN frames is abnormal. The plurality of CAN frames may include identifiers that are different depending on frame types. The first rule may indicate allowable CAN frame reception period ranges corresponding to the identifiers. The operations may further include: detecting an abnormality based on reception times corresponding to CAN frames having a same identifier such that, in a second case where a difference between a first reception time of a first CAN frame of the plurality of CAN frames and a second reception time of a second CAN frame of the plurality of CAN frames received one frame before the first CAN frame is within an associated allowable CAN frame reception period range indicated by the first rule, the first CAN frame is abnormal.

Thus, even in a situation in which there is an abnormality on the second network, an abnormality of a CAN frame having periodicity can be detected at a device on the first network, and it is possible to safely stop the automated driving or the advanced driver assistance system.

In the abnormality detection apparatus, the first rule may further indicate allowable amounts of change corresponding to the identifiers, with the allowable amounts of change being determined from a data value of a CAN frame immediately previous to a current CAN frame. The operations may further include: detecting an abnormality such that, in a third case where a difference of a first data value of the first CAN frame from a second data value of the second CAN frame is within an associated allowable amount of change indicated by the first rule, the first CAN frame is abnormal.

Thus, in the abnormality detection apparatus, even in a situation in which there is an abnormality on the second network, an abnormality of a data value of a CAN frame can be detected at a device on the first network, and it is possible to stop the automated driving.

In the abnormality detection apparatus, the operations may further include: acquiring, as the abnormality detection rule, rules associated with the identifiers; and detecting that the CAN frame, which indicates the state information, is abnormal based on the abnormality detection rule.

Thus, when a process performed on the second network is tight, detecting of an abnormality on the second network can be performed by a device on the first network, and thus load balancing is achieved.

It should be noted that general or specific embodiments may be implemented as a system, a method, an integrated circuit, a computer program, a computer-readable storage medium such as a CD-ROM disk, or any selective combination of a system, a method, an integrated circuit, a computer program, and a storage medium.

The abnormality detection apparatus and the abnormality detection method according to embodiments are described below with reference to drawings. Note that any embodiment described below is provided to illustrate a specific example of the present disclosure. In the following embodiments of the present disclosure, values, constituent elements, locations of elements, manners of connecting elements, steps and the order of steps in processes, and the like are described by way of example but not limitation. Among constituent elements described in the following embodiments, those constituent elements that are not described in independent claims are optional. Note that each drawing is a schematic diagram, which does not necessarily provide a strict description. First Embodiment FIG. 1 is a schematic diagram illustrating an overall configuration of an in-vehicle network according to a first embodiment.

A network system 3 of a vehicle 1 is a network communication system installed in the vehicle 1 and including various devices such as a control apparatus, a sensor, an actuator, a user interface apparatus, and/or the like. The network system 3 includes a first network 10 and a second network 20. The vehicle 1 is an example of a mobility entity. The first network 10 is an Ethernet (registered trademark) network that transmits an Ethernet (registered trademark) frame (hereinafter referred to as an "E-frame") according to an Ethernet (registered trademark) protocol. The second network 20 is a CAN network that transmits a data frame (a CAN frame) or the like via a bus according to a CAN protocol.

As illustrated in FIG. 1, the network system 3 includes a central gateway 400, a telematics control unit 410, a diagnosis port 420, an automated driving DCU (Domain Control Unit) 100, an automated driving ECU 110, a camera 120, a LIDAR 130, a dynamic map ECU 140, an infotainment DCU 300, an IVI (In-Vehicle Infotainment) 310, a CAN gateway 200, an engine ECU 210, a steering ECU 220, a brake ECU 230, a window ECU 240, a first transmission line 11, and a second transmission line 21. The first transmission line 11 is a transmission line of the first network 10, and is, for example, an Ethernet (registered trademark) cable. The second transmission line 21 is a transmission line of the second network 20, and is, for example, a CAN bus.

Note that the network system 3 may further include one or more ECUs or DCUs in addition to the ECUs 110, 140, 210, 220, 230, and 240 and DCUs 100 and 300 described above. For example, the second transmission line 21 may be further connected to one or more ECUs (not shown) in addition to the ECUs 210, 220, 230, and 240.

The ECUs 110, 140, 210, 220, 230, and 240 and the DCUs 100 and 300 are each an apparatus including a processor (microprocessor), a digital circuit such as a memory, an analog circuit, a communication circuit and/or the like. The memory is a ROM, a RAM or the like and is capable of storing a program (a computer software program) executed by the processor. The memory may include a non-volatile memory. For example, the process operates according to a program (computer program) thereby realizing various functions of ECUs. The computer program includes a combination of a plurality of instruction codes indicating instructions to be executed by the processor to achieve a particular function.

Each of the ECUs 210, 220, 230, and 240 transmits/receives a frame according to the CAN protocol. The ECUs 210, 220, 230, and 240 are respectively connected to devices such as an engine, a steering, a brake, a window open/close sensor, and acquire states of these devices and, for example, periodically transmit data frames indicating the states to the second network 20 including the second transmission line 21 etc. Each of the ECUs 210, 220, 230, and 240 receives a data frame from the second transmission line 21 forming the second network 20, interprets the data frame, and determines whether the data frame has a CAN-ID indicating that the data frame is to be received. Depending on a determination result, each of the ECUs 210, 220, 230, and 240 may control a device connected to the ECU according to data in the data field (a content of the data field), or may generate a data frame and transmit it as required.

Each of the ECUs 110 and 140 or each of the DCUs 100 and 300 transmits or receives an E-frame according to the Ethernet (registered trademark) protocol. Each of the DCUs 100 and 300 is connected to a device such as the IVI 310, the automated driving ECU 110, the camera 120, the LIDAR 130, the dynamic map ECU 140 or the like, and each of the DCUs 100 and 300 performs a process based on information acquired from the device. Each of the DCUs 100 and 300 may control the device connected thereto as required, or may transmit information to another ECU as required.

The central gateway 400 is connected to the telematics control unit 410, the diagnosis port 420, the automated driving DCU 100, the CAN gateway 200, and the infotainment DCU 300 via the first transmission line 11. The central gateway 400 includes, for example, a digital circuit such as a memory or the like, an analog circuit, a communication circuit, and/or the like.

The telematics control unit 410 is a unit by which the vehicle 1 communicates with the server 2 located on the external network 30. The telematics control unit 410 may have a wireless communication interface according to a communication standard used in a mobile communication system such as a 3rd generation mobile telecommunication system (3G), a 4th generation mobile telecommunication system (4G), or LTE (registered trademark), or may have a wireless LAN (Local Area Network) interface according to IEEE802.11a, b, g, n standards. The external network 30 may be a portable telephone communication network, Wi-Fi, or the like. The server 2 is, for example, a computer having a function of providing information to an ECU of the vehicle 1.

The diagnosis port 420 is a port used by a dealer in performing failure diagnosis on the vehicle 1. More specifically, the diagnosis port 420 is used in transmitting/receiving a diagnosis command.

The automated driving DCU 100 is connected, via the first transmission line 11, the automated driving ECU 110, the camera 120, the LIDAR 130, and the dynamic map ECU 140.

The automated driving ECU 110 generates a control command to control driving of the vehicle 1. More specifically, the automated driving ECU 110 generates a control command for controlling steering of wheels, an engine for driving wheels such that the wheels rotate, a mechanical power source such as a motor, a brake for braking wheels, and/or the like. More specifically, the control command is a control command that causes the vehicle 1 to execute at least one of moving forward (that is, running forward), making a turn, and stopping. The automated driving ECU 110 transmits the generated control command to the second network 20.

The camera 120 is a camera for capturing an image of the surroundings of the vehicle 1, that is, the situation outside the vehicle. The camera 120 may be installed, for example, on an outside surface of a body of the vehicle 1.

The LIDAR 130 is a sensor for detecting an obstruction located outside the vehicle. The LIDAR 130 is a laser sensor configured, for example, to detect a distance to an object located in a horizontal detection range over entire 360 degrees and a vertical detection range over a particular angular range (for example, 30 degrees). The LIDAR 130 emits a laser beam to the outside of the vehicle 1 and detects a reflection from an object located in the outside of the vehicle 1 thereby measuring the distance to the object from the LIDAR 130.

The dynamic map ECU 140 is an electronic control unit for receiving data used in a dynamic map and decoding the dynamic map using the received data. The decoded dynamic map is used, for example, in controlling the automated driving by the automated driving ECU 110.

The CAN gateway 200 is a gateway connected to the second network 20 and the first network 10. In the present embodiment, the second network 20 includes two CAN buses one of which is a control bus connected to the engine ECU 210, the steering ECU 220, and the brake ECU 230 and the other one of which is a body bus connected to the window ECU 240 for controlling opening/closing of a window. The CAN gateway 200 includes a processor, a digital circuit such as a memory, an analog circuit, a communication circuit and/or the like. The CAN gateway 200 has a function of transferring (or relaying) a frame received from one of the two transmission lines 11 and 21 to the other one transmission line. The transferring of a frame by the CAN gateway 200 is relaying of data associated with the frame. In the frame transferring, the CAN gateway 200 may perform a conversion of a communication scheme, a frame format, and/or the like depending on a communication protocol used in a destination transmission line. In the frame transferring between transmission lines, the CAN gateway 200 may transfer one or more frames, in response to receiving one or more frames from one or more transmission lines, to one or more transmission lines.

The infotainment DCU 300 is connected to the IVI 310 via the first transmission line 11 and manages domains of the information network. The IVI 310 is an apparatus including a display and having a multimedia function including playing an image, a sound/voice, and/or the like.

FIG. 2 is a diagram illustrating a format of a data frame (a CAN frame) transmitted/received via the second network.

In the second network 20, each of the ECUs 210, 220, 230, and 240 receives/transmits a frame according to the CAN protocol. Frames according to the CAN protocol include a data frame, a remote frame, an overload frame, and an error frame. The following description will focus mainly on data frames.

FIG. 2(a) illustrates a standard format. In the standard format, a data frame includes an SOF (Start Of Frame) field, an ID (CAN-ID) field, a RTR (Remote Transmission Request) field, an IDE (Identifier Extension) field, a reserved bit "r", a size field, a data field, a CRC (Cyclic Redundancy Check) sequence field, a CRC delimiter field "DEL", an ACK (Acknowledgement) slot, an ACK delimiter "DEL", and an EOF (End Of Frame) field. The ID (CAN-ID) is a content of an ID field and is an identifier indicating a data type. The ID is also referred to as a message ID. That is, the CAN frame includes an identifier that is different depending on the data type. In CAN, in a case where a plurality of nodes start transmission at the same time, a communication arbitration is performed such that a higher priority is given to a frame having a smaller value of CAN-ID. The size is DLC (Data Length Code) indicating a length of a data field (data) described later. Specifications of the data (the content of the data field) are not defined in the CAN protocol, but determined in the network system 3. Therefore, the specification of the data can be dependent on the vehicle type, the manufacturer (maker), or the like of the vehicle.

FIG. 2(b) illustrates an extended format. In the following description of the present embodiment, it is assumed by way of example that the second network 20 uses the standard format. However, in a case where the extended format is used in the first network 10, a 11-bit base ID (part of the CAN-ID) of the ID field and a 18-bit extended ID (the remaining part of the CAN-ID) may be combined into a 29-bit CAN-ID.

FIG. 3 is a diagram illustrating a format of an E-frame transmitted/received in the first network.

As shown in FIG. 3, the E-frame includes an Ethernet (registered trademark) payload (also referred to as an "E-payload") which is a main part of data to be transmitted and an Ethernet (registered trademark) header (also referred to as an "E-header"). The E-header includes a destination MAC address and a source MAC address. The E-payload includes an IP header, a TCP/UDP header, and data. The IP header includes a source IP address and a destination address. Note that in FIG. 3, the IP header is denoted as "IPv4 header". The TCP/UDP header denotes a TCP header or a UDP header. The TCP/UDP header includes a source port number and a destination port number.

In the network system 3, when the CAN gateway 200 transfers a CAN frame received from a CAN bus to the first network 10, the CAN gateway 200 transmits an E-frame including a plurality of pieces CAN frame information. The CAN frame information is information extracted from a CAN frame transmitted via a CAN bus and including at least a content (data) of a data field. The CAN frame information may include, for example, CAN-ID and a size.

Figure 4:
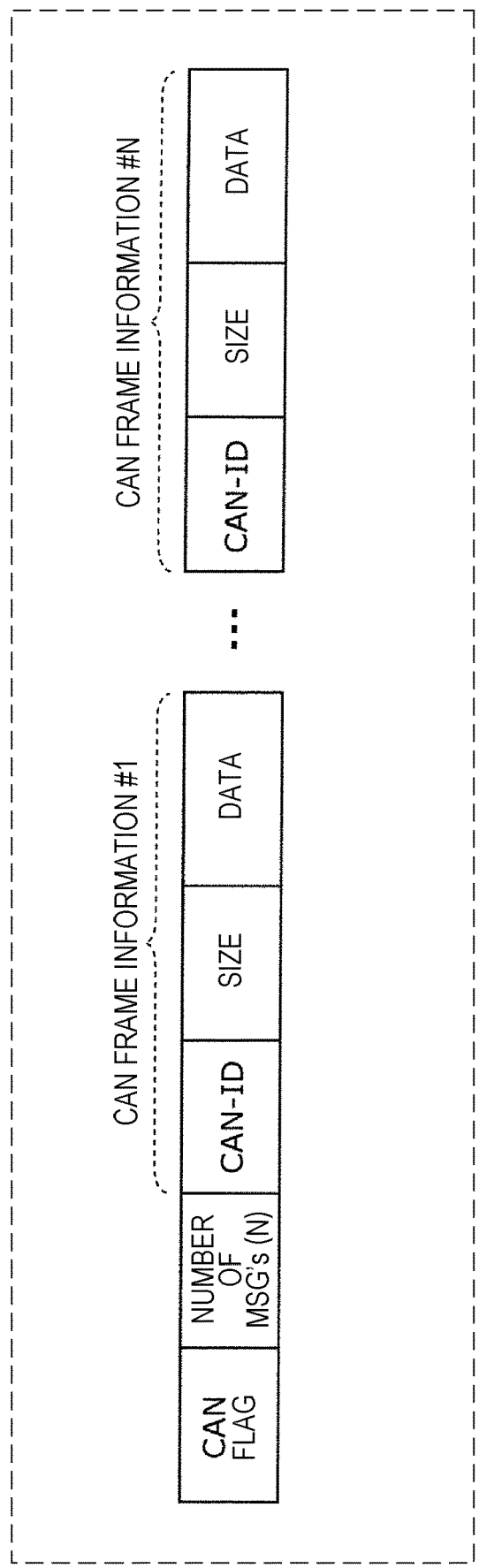
FIG. 4 is a diagram illustrating an example of a data structure of a payload in an E-frame.

FIG. 4 illustrates an example of a data structure of a payload in the E-frame shown in FIG. 3. In the example shown in FIG. 4, CAN frame information includes a CAN-ID, a size, and data. In FIG. 4, the number of messages (the number of MSG's) indicates the number of pieces of CAN frame information. Instead of the number of messages, information indicating the total amount of data of the CAN frame information or the like may be used. A CAN flag is an identification flag identifying whether the E-frame includes information (CAN frame information) transmitted from the second network 20. This CAN flag is set ON when the E-payload of the E-frame includes CAN frame information, while in any other cases the CAN flag is set OFF (indicating information opposite to ON). In FIG. 4, the CAN flag is placed at the beginning of the E-payload of the E-frame, but this is merely an example. By placing a plurality of pieces of CAN frame information in an E-payload of an E-frame as in the example shown in FIG. 4, for example, it becomes possible to achieve a high transmission efficiency.

Figure 5:
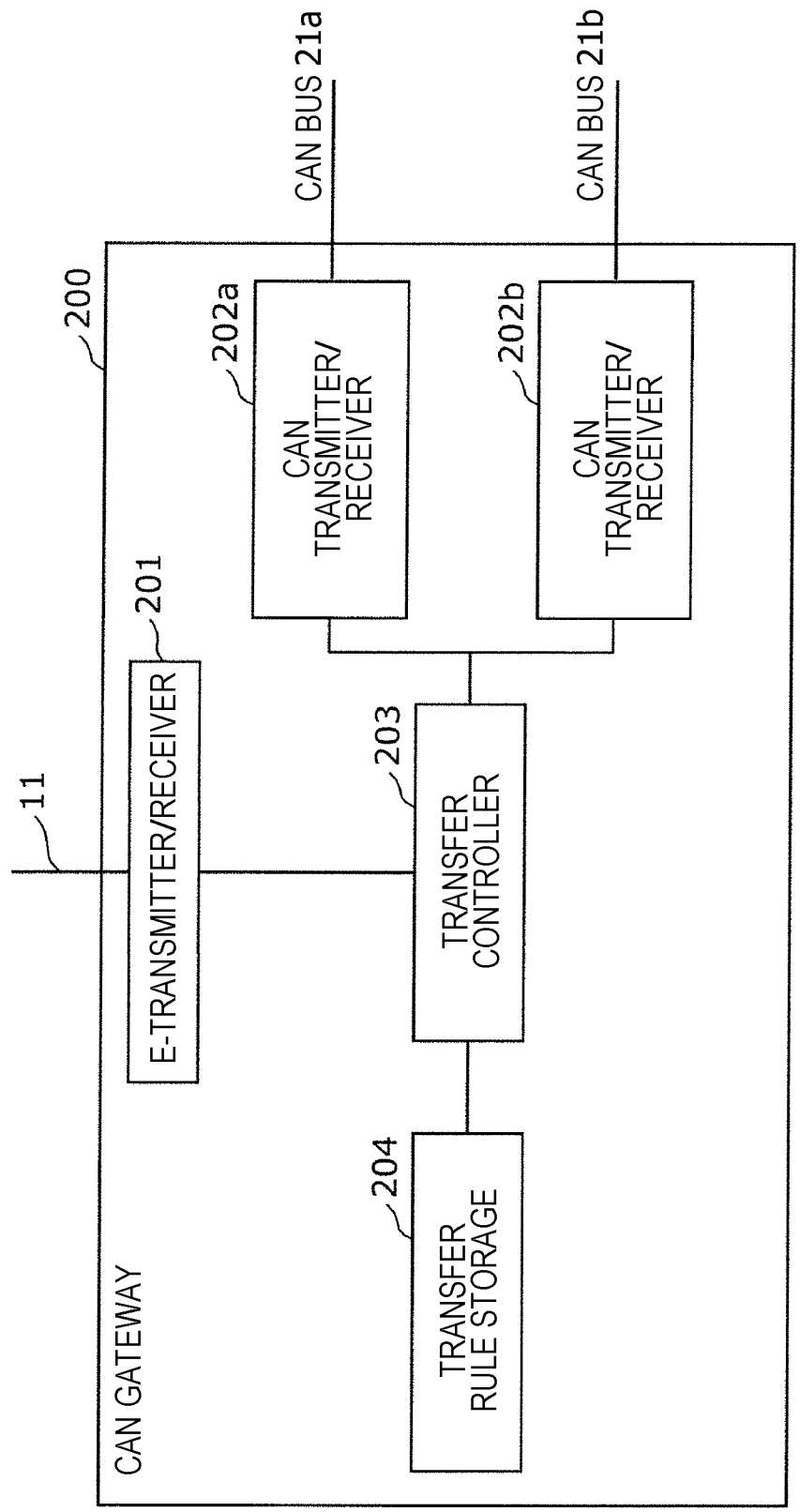
FIG. 5 is a block diagram illustrating an example of a functional configuration of a CAN gateway.

FIG. 5 is a block diagram illustrating an example of a functional configuration of a CAN gateway.

As shown in FIG. 5, the CAN gateway 200 includes an Ethernet (registered trademark) transmitter/receiver 201 (hereinafter, referred to as an "E-transmitter/receiver 201"), CAN transmitter/receivers 202a and 202b, a transfer controller 203, and a transfer rule storage 204. These elements are realized in the CAN gateway 200 using a communication circuit, a memory, a digital circuit, a processor that executes a program stored in the memory.

The E-transmitter/receiver 201 is a communication circuit or the like connected to the first transmission line 11 included in the first network 10. The E-transmitter/receiver 201 receives an E-frame from the first transmission line 11. Furthermore, the E-transmitter/receiver 201 transmits an E-frame to the first transmission line 11.

The CAN transmitter/receiver 202a is a communication circuit or the like connected to the CAN bus 21a included in the second network 20. The CAN transmitter/receiver 202a sequentially receives CAN frames from the CAN bus 21a. Furthermore, the CAN transmitter/receiver 202a transmits a CAN frame to the CAN bus 21a.

The CAN transmitter/receiver 202b is a communication circuit or the like connected to the CAN bus 21b included in the second network 20. The CAN transmitter/receiver 202b sequentially receives CAN frames from the CAN bus 21b. Furthermore, the CAN transmitter/receiver 202b transmits a CAN frame to the CAN bus 21b.

The transfer rule storage 204 is realized by a storage medium such as a memory or the like. The transfer rule storage 204 stores rule information defining a frame transfer condition and/or the like. The rule information includes, for example, transfer rule information defining a CAN-ID to be transferred, a source bus, and a destination (MAC address or the like) associated together, a priority transfer list describing a CAN-ID given priority in transfer, a transfer source bus, a destination associated together, and/or the like.

The transfer controller 203 is realized, for example, by a processor or the like that executes a program such that the transfer controller 203 determines whether or not a received frame is to be transferred, and controls transferring depending on a determination result. The control of the transferring is performed, for example, such that a plurality of pieces of CAN frame information are stored in a payload in an E-frame based on sequentially received CAN frames, and the resultant E-frame is transmitted from the E-transmitter/receiver 201 to the first transmission line 11.

Figure 6:
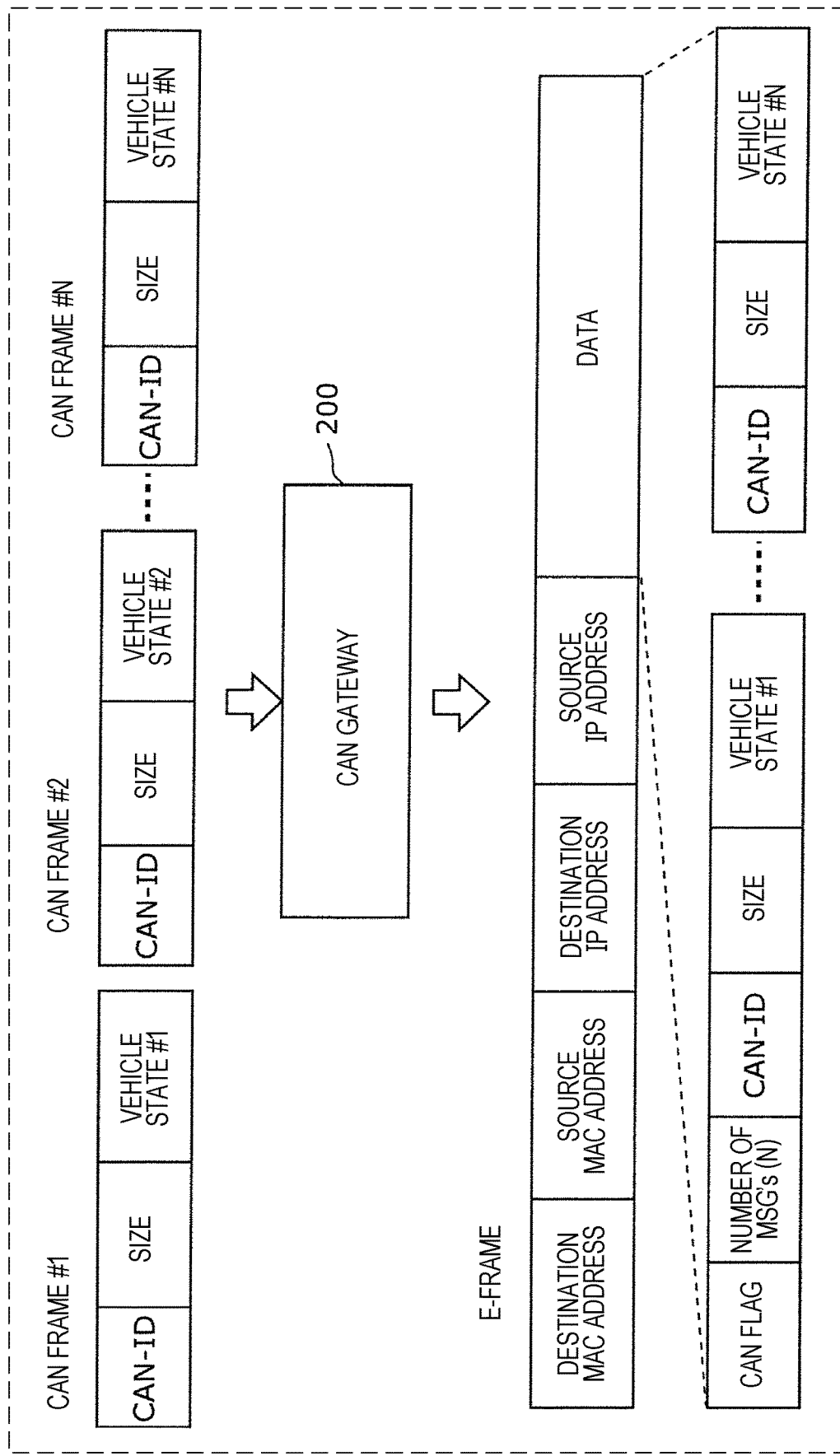
FIG. 6 is a diagram conceptually illustrating a manner in which a CAN gateway transmits an E-frame based on a plurality of received CAN frames according to the first embodiment.

FIG. 6 conceptually illustrates a manner in which the CAN gateway 200 transmits an E-frame based on a plurality of received CAN frames (CAN frames #1 to #N) according to the first embodiment.

As shown in FIG. 6, when the CAN gateway 200 transfers frames, the CAN gateway 200 changes configurations of the frames. For example, as many pieces of CAN frame information as a predetermined number N are stored in a payload of an E-frame to be transmitted. The data of the N pieces of CAN frame information includes a content (data) of each of the data fields of received N CAN frames, and the like. The data of CAN frames waiting to be transferred is stored, for example, in a storage medium (buffer) such as a memory provided in the CAN gateway 200. The E-frame including N pieces of CAN frame information shown in FIG. 6 is received, for example, by a destination ECU or DCU (for example, an infotainment DCU 300) via the central gateway 400. In a header of the E-frame, a MAC address of the CAN gateway 200 is set as a source MAC address, while in an E-payload of the E-frame, a CAN flag is set to ON to indicate that the E-frame includes CAN frame information. As for a destination MAC address of the E-frame, a MAC address of a destination ECU or DCU is set according to the transfer rule information or the like stored in the transfer rule storage 204.

In the present embodiment, to detect an abnormality of an automated driving control command, the CAN gateway 200 combines and convers N CAN frames including state information indicating a vehicle state flowing on the second network 20 into a single E-frame. In the present embodiment, the vehicle states included in CAN frames indicate a current vehicle speed, a steering angle, a shift position, and/or the like. The vehicle states are examples of states of the mobility entity.

The transfer controller 203 controls the E-transmitter/receiver 201, the CAN transmitter/receivers 202a and 202b to transmit frames under a predetermined condition depending on a determination result or the like. The transfer controller 203 determines, based on CAN-ID's, whether or not data of CAN frames received by the CAN transmitter/receivers 202a and 202b is to be transmitted to the first network 10. This determination is made according to the standard rule information predefined for the CAN-ID. Furthermore, the transfer controller 203 selects a destination of the data of the CAN frames according to the standard rule information. The determination as to whether or not the CAN frames are to be transmitted to the first network 10 and the selection of the destination of the frames (the E-frame or the CAN frames) including the data of the CAN frames are performed, for example, based on the transfer rule information indicating one or more CAN-ID's or the like of CAN frames whose data is to be transmitted to the first network 10.

Figure 7:
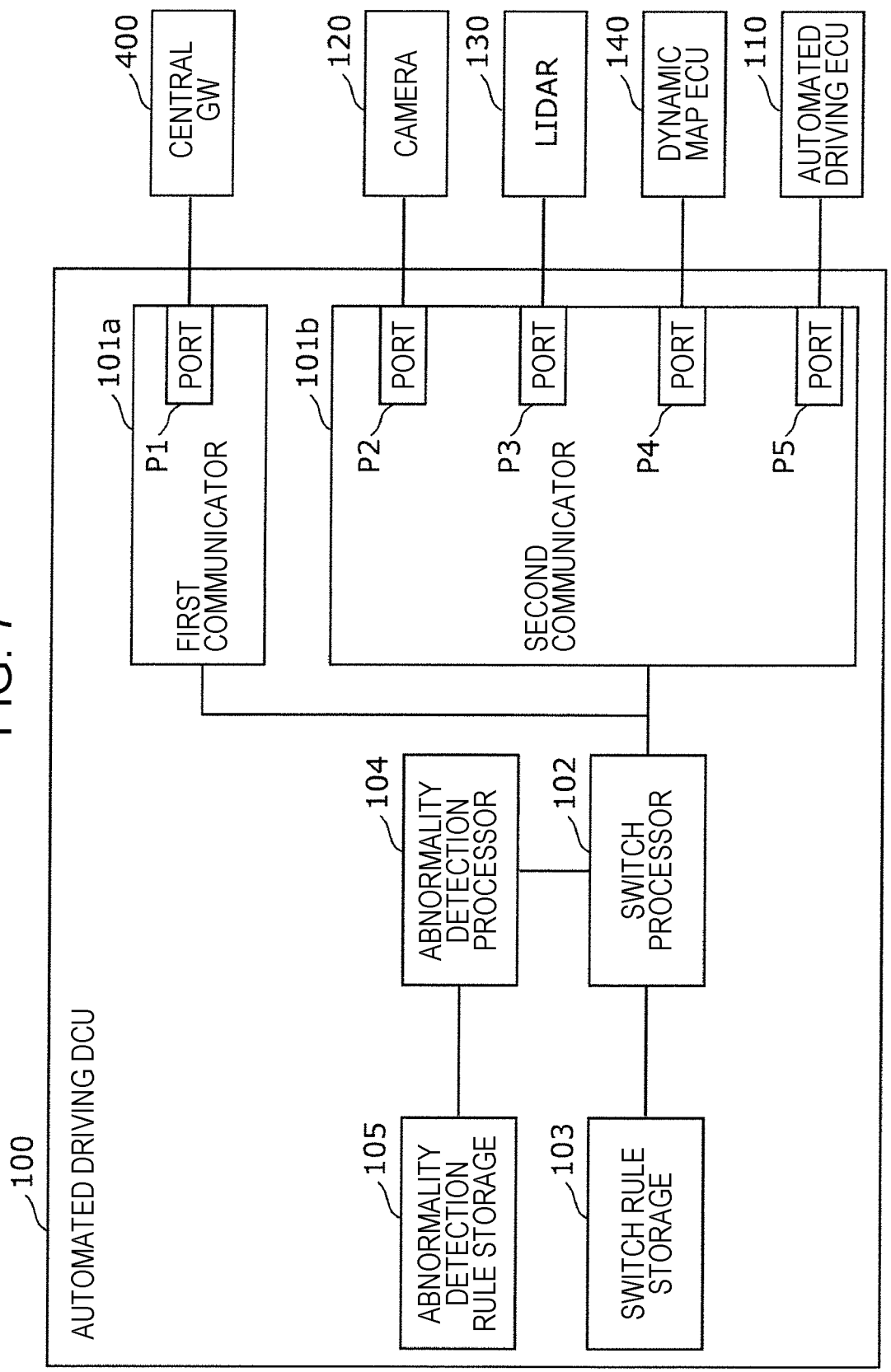
FIG. 7 is a block diagram illustrating an example of a functional configuration of an automated driving DCU.

FIG. 7 is a block diagram illustrating an example of a functional configuration of the automated driving DCU 100.

As shown in FIG. 7, the automated driving DCU 100 includes a first communicator 101a, a second communicator 101b, a switch processor 102, a switch rule storage 103, an abnormality detection processor 104, and an abnormality detection rule storage 105. The automated driving DCU 100 is an example of the abnormality detection apparatus.

In the present embodiment, the first communicator 101a has one Ethernet (registered trademark) port (port P1). The port P1 is connected to the central gateway 400 via the first transmission line 11. That is, the first communicator 101a transmits and receives data to/from the central gateway 400. That is, the first communicator 101a receives an E-frame including, as data, CAN frames. Thus, the first communicator 101a receives CAN frames thereby receiving state information included in the CAN frames.

In the present embodiment, the second communicator 101b has four Ethernet (registered trademark) ports (ports P2 to P5). The ports P2 to P 5 are respectively connected to the camera 120, the LIDAR 130, the dynamic map ECU 140, and the automated driving ECU 110 via the first transmission line 11. That is, the second communicator 101b transmits and receives a first frame (that is, an E-frame) according to a communication protocol of the first network 10 (that is, an Ethernet (registered trademark) protocol). Furthermore, the second communicator 101b includes the first communicator 101a that transmits and receives an E-frame via the port P1.

The switch processor 102 performs a process of transferring an E-frame received by the second communicator 101b to a proper transfer destination based on a rule stored in the switch rule storage 103.

FIG. 8 is a diagram illustrating an example of a switch rule stored in the switch rule storage 103.

As shown in FIG. 8, the switch rule includes items associated with an input port, a source IP address a source MAC address, an output port, a destination IP address, and a transmission MAC address. In the present embodiment, the switch rule includes items associated with is a white list indicating a correct transfer destination for a normal E-frame. The switch rule indicates, for example, that an E-frame from the CAN gateway 200 is allowed to be received at the port P1 via the central gateway 400, and transferred to the automated driving ECU 110 connected to the port P5. In this case, a MAC address of the central gateway 400 is set as a source MAC address for an E-frame received at an input port, that is, the port P1, while an IP address of the CAN gateway 200 is set as a source IP address. On the other hand, an IP address and a MAC address of the automated driving ECU are set as a destination IP address and a transmission MAC address connected to the port #5 functioning as an output port.

In the switch rule shown in FIG. 8, the camera 120 connected to the port #2, the LIDAR 130 connected to the port #3, and the dynamic map ECU 140 connected to the port #4 are allowed to transfer data to the automated driving ECU 110 connected to the port #5. As for E-frames from the automated driving ECU 110 connected to the port #5, it is required to transmit them to the CAN gateway 200, and thus the IP address of the CAN gateway 200 is set as their destination IP and the MAC address of the central gateway is set as their transmission MAC address.

In the switch rule, a transmission source and a destination at input or output ports are defined by an IP address or a MAC address, but the switch rule is not limited to this example. For example, such that only an IP address may be defined, or only a MAC address may be defined. Furthermore, in the switch rule, the transmission source or the destination may be defined by information other than the IP address or the MAC address, or a service port number may be defined. This makes it possible to limit transmission sources and destinations at inputs or outputs to those on paths allowed by the switch rule.

In FIG. 8, the switch rule is defined by the white list. Instead, the switch rule may be defined by a black list. Note that the switch rule shown in FIG. 8 is part of the rule, but everything is not shown in FIG. 8. That is, the switch rule is set such that all necessary paths are defined.

The abnormality detection processor 104 detects whether a control command included in an E-frame received by the second communicator 101b is abnormal or not, based on state information associated with the vehicle 1 received by the first communicator 101a from the second network 20 via the CAN gateway 200 and the abnormality detection rule stored in the abnormality detection rule storage 105. The control command is, for example, an automated driving control command generated by the automated driving ECU 110. In a case where the abnormality detection processor 104 determines that the control command is normal, the abnormality detection processor 104 allows the second communicator 101b to transmit this control command to be transmitted from the central gateway 400 to the second network 20 via the CAN gateway 200. In a case where the abnormality detection processor 104 determines that the control command is abnormal, the abnormality detection processor 104 prohibits the control command from being transferred by the second communicator 101b to the second network 20.

FIG. 9 is a diagram illustrating an example of an abnormality detection rule stored in the abnormality detection rule storage 105 of the automated driving DCU 100 according to the first embodiment. The abnormality detection rule is a rule according to which automated driving control using Ethernet (registered trademark) is allowed based on a vehicle state acquired from the second network 20. That is, the abnormality detection rule includes a first rule indicating a control command allowed in each of a plurality of states of the vehicle.

As shown in FIG. 9, the first rule of the abnormality detection rule indicates a combination of a vehicle speed instruction and a steering instruction allowed depending on a vehicle speed state and a shift state of the vehicle 1. Note that the vehicle speed state indicates a speed of the vehicle 1 being running. For example, a speed range from 0 km/h to 30 km/h is defined as a low speed, a speed range from 30 km/h to 60 km/h is defined as a middle speed, and a speed range from 60 km/h to 100 km/h is defined as a high speed. The shift state indicates a shift position such as parking (P), reverse (R), neutral (N), drive (D), or the like. The vehicle speed instruction indicates a speed value by which the current vehicle speed is allowed to be increased or reduced. The steering instruction indicates an angle by which the current steering angle is allowed to be increased or reduced.

The first rule indicates, for example, that when the vehicle speed state is at a low speed and the shift state is in the drive (D) position, it is allowed to increase or reduce the vehicle speed if the vehicle speed instruction in the automated driving control is within a range of 10 km/h from the current vehicle speed indicated by the state information. Furthermore, the first rule indicates, for example, that when the vehicle speed state is at a middle speed and the shift state is in the drive (D) position, it is allowed to increase or reduce the vehicle speed if the vehicle speed instruction in the automated driving control is within a range of 20 km/h from the current vehicle speed indicated by the state information. Furthermore, the first rule indicates, for example, that when the vehicle speed state is at a low speed and the shift state is in the drive (D) position it is allowed to increase or reduce the vehicle speed if the vehicle speed instruction in the automated driving control is within a range of 30 km/h from the current vehicle speed indicated by the state information.

In the first rule, the steering angle in the steering instruction is also defined as well as the vehicle speed. More specifically, the first rule indicates, for example, that when the vehicle speed state is at a low speed and the shift state is in the drive (D) position, it is allowed to change the steering angle to the right or left if the steering instruction in the automated driving control is within a range of 360 degrees from the current steering angle indicated by the state information. Furthermore, the first rule indicates, for example, that when the vehicle speed state is at a middle speed and the shift state is in the drive (D) position, it is allowed to change the steering angle to the right or left if the steering instruction in the automated driving control is within a range of 180 degrees from the current steering angle indicated by the state information. Furthermore, the first rule indicates, for example, that when the vehicle speed state is at a high speed and the shift state is in the drive (D) position, it is allowed to change the steering angle to the right or left if the steering instruction in the automated driving control is within a range of 90 degrees from the current steering angle indicated by the state information.

If a state of the vehicle 1 indicated by the state information is not included in states associated, in the first rule, with control commands, the abnormality detection processor 104 detects that the control command is abnormal. More specifically, for example, in a case where the control command received by the second communicator 101b includes a vehicle speed increase/reduction instruction is output of an allowable range associated, in the first rule, with the vehicle speed or in a case where the control command received by the second communicator 101b includes a steering instruction is output of an allowable range associated, in the first rule, with the steering angle, the abnormality detection processor 104 detects that the control command is abnormal, and the abnormality detection processor 104 prohibits the control command from being transferred by the first communicator 101a to the second network 20.

Next, an operation of the network system 3 installed in the vehicle 1 according to the first embodiment is described below.

Figure 10:
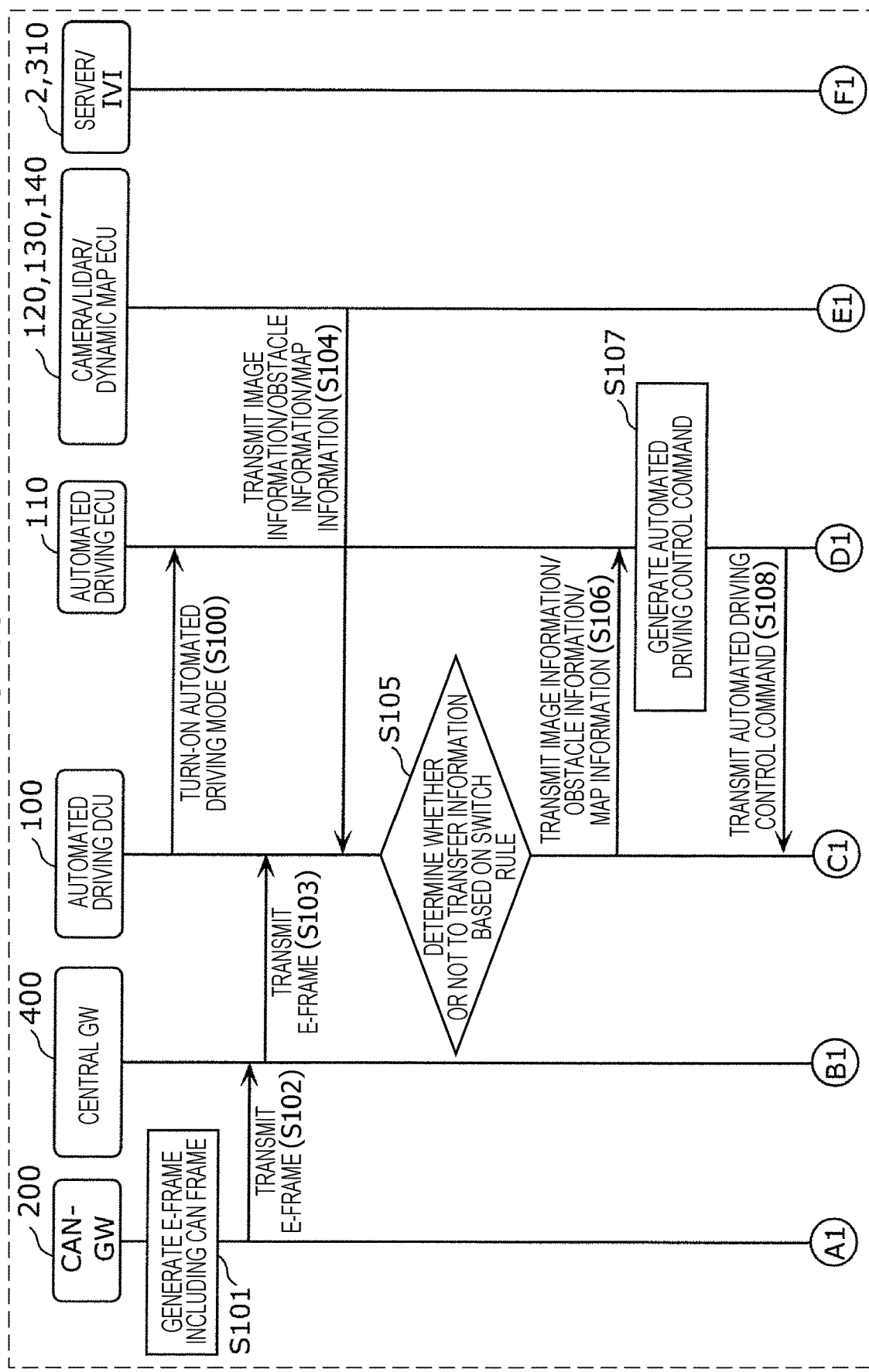
FIG. 10 is a sequence diagram illustrating an example of a method of detecting an abnormality in a network system according to the first embodiment.
Figure 11:
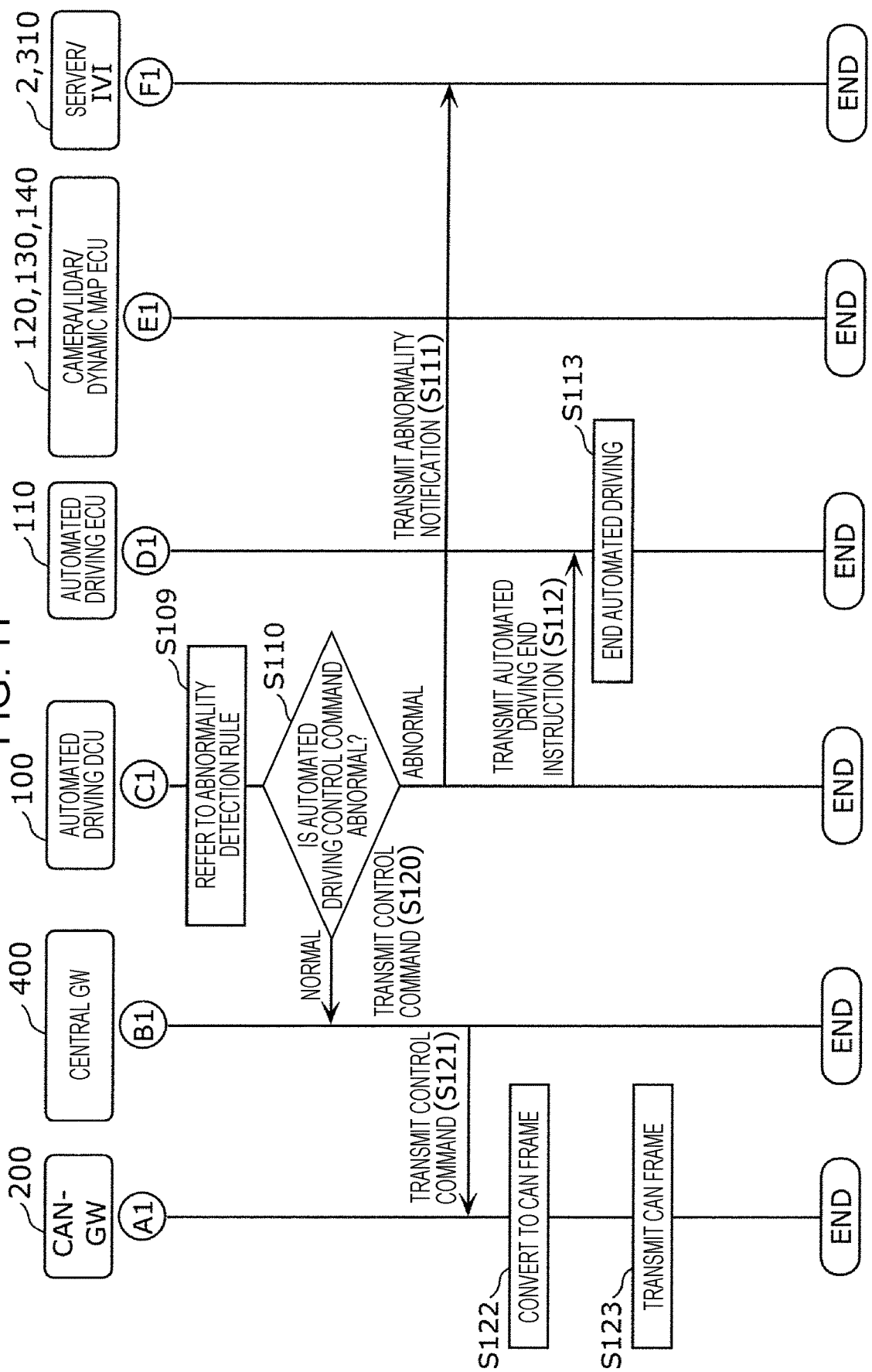
FIG. 11 is a sequence diagram illustrating an example of a method of detecting an abnormality in a network system according to the first embodiment.

FIG. 10 and FIG. 11 are sequence diagrams illustrating an example of an abnormality detection method in the network system 3 according to the first embodiment.

First, the automated driving DCU 100 sets the automated driving ECU 110 to a state in which an automated driving mode is enabled (S100). For example, when an inputting operation performed by a user to turn on the automated driving mode is accepted, the automated driving DCU 100 enables the automated driving mode.

The CAN gateway 200 receives a CAN frame including the state information on the vehicle 1 from each of the ECUs 210, 220, 230, and 240 connected to the CAN gateway 200, and generates an E-frame including the CAN frame associated with the state information on the vehicle 1 as shown in FIG. 6 (S101).

The CAN gateway 200 transmits the E-frame including the CAN frame associated with the state information on the vehicle 1 to the central gateway 400 (S102).

The central gateway 400 transmits the E-frame received in step S102 to the automated driving DCU 100 (S103).

In the automated driving DCU 100, the second communicator 101b receives image information representing an image captured by the camera 120, obstruction information based on information indicating a distance to an object detected by the LIDAR 130, and map information obtained by the dynamic map ECU 140, respectively from the camera 120, the LIDAR 130, and the dynamic map ECU 140 (S104).

In the automated driving DCU 100, the switch processor 102 determines whether information has been received via a correct path based on the switch rule stored in the switch rule storage 103 (S105).

Thus, in the automated driving DCU 100, in step S104, the second communicator 101b transfers information such as image information, obstruction information, map information, or the like received from the camera 120, the LIDAR 130, or the dynamic map ECU 140 such that if the switch processor 102 determines that the information has been received via a correct path, then the second communicator 101b transfers the information to the automated driving ECU 110 (S106).

The automated driving ECU 110 generates an automated driving control command based on the information such as the image information, the obstruction information, the map information, and/or the like received in step S106 (S107). In this step, the automated driving ECU 110 first generates CAN frames to be transmitted to the control CAN bus and then generates an E-frame such that the CAN frames are stored in a data field of the E-frame. The generated E-frame is a control command for the automated driving.

The automated driving ECU 110 transmits the automated driving control command to the automated driving DCU 100 (S108).

In the automated driving DCU 100, the abnormality detection processor 104 refers to the abnormality detection rule stored in the abnormality detection rule storage 105 (S109). Herein, the first rule shown in FIG. 9 is referred to.

In the automated driving DCU 100, the abnormality detection processor 104 refers to, in addition to the abnormality detection rule, the E-frame including the CAN frame associated with the state information on the vehicle 1 received in S103, and the abnormality detection processor 104 determines whether the control command received by the second communicator 101b in step S108 is abnormal (S110). In a case where the abnormality detection processor 104 determines that the control command is abnormal (abnormal in step S110), the abnormality detection processor 104 transfers the process to step S111. On the other hand, in a case where the abnormality detection processor 104 determines that the control command is normal (normal in step S110), the abnormality detection processor 104 transfers the process to step S120.

In the automated driving DCU 100, in response to determining that the control command is abnormal, the abnormality detection processor 104 issues, via the second communicator 101b, a notification including information indicating that the server 2 or the IVI 310 has an abnormality (S111). This makes it possible for a driver or a remote security monitoring service company to recognize an occurrence of the abnormality in the vehicle 1 during the automated driving. Note that in this case, the abnormality detection processor 104 does not transmit the control command to the central gateway 400. That is, in this case, the abnormality detection processor 104 prohibits transferring of the control command determined to be abnormal to the second network 20 via the central gateway 400 and the CAN gateway 200.

In the automated driving DCU 100, the abnormality detection processor 104 transmits an automated driving end instruction to the automated driving ECU 110 via the second communicator 101b (S112).

When the automated driving ECU 110 receives the end instruction transmitted in step S112, the automated driving ECU 110 ends the automated driving mode (S113). Note that the automated driving ECU 110 may start the manual driving mode after automated driving ECU 110 ends the automated driving mode.

In a case where it is determined in step S110 that the control command is normal (normal in S110), the abnormality detection processor 104 transmits the automated driving control command to the central gateway 400 via the second communicator 101b (S120).

The central gateway 400 transfers the automated driving control command transmitted instep S120 to the CAN gateway 200 (S121).

The CAN gateway 200 converts the automated driving control command in the E-frame received in step S121 to a CAN frame (S122).

The CAN gateway 200 transmits the CAN frame converted in step S122 to the second network 20 (S123). Thus, the engine ECU 210, the steering ECU 220, or the brake ECU 230 connected to the control CAN bus receives the automated driving control command in the CAN frame and executes a control according to the received control command thereby performing automated driving control.

In the present embodiment, the abnormality detection apparatus is an abnormality detection apparatus installed in the vehicle 1 and configured to detect an abnormality in the network system 3 including the first network 10 and the second network 20 which are different in communication protocol from each other. The automated driving DCU 100 includes the first communicator 101a, the second communicator 101b, the abnormality detection rule storage 105, and the abnormality detection processor 104. The first communicator 101a receives state information indicating the state of the vehicle 1 acquired from the second network 20. The second communicator 101b transmits and receives E-frames using the communication protocol of the first network 10. The abnormality detection rule storage 105 stores the abnormality detection rule. The abnormality detection processor 104 detects, based on the state information and the abnormality detection rule, whether the control command included in the E-frame received by the second communicator 101b is abnormal. In a case where the abnormality detection processor 104 detects that the control command is abnormal, the abnormality detection processor 104 prohibits the transferring of this control command.

Thus, the abnormality detection apparatus detects whether the generated automated driving control command is abnormal based on the abnormality detection rule and the state information associated with the vehicle 1 acquired from the second network 20. The abnormality detection apparatus prohibits the transferring of the control command detected to be abnormal. Thus, even in a case where, for example, a device connected to the first network 10 is vulnerability and the device is attacked via the first network 10, the abnormality detection apparatus is capable of preventing the automated driving from being controlled unauthorizedly.

Furthermore, in the abnormality detection apparatus according to the present embodiment, the abnormality detection rule includes the first rule indicating control commands that are allowed in respective different states of the vehicle 1. In a case where a state of the vehicle 1 indicated by the state information is not included in the states associated, in the first rule, with control commands, the abnormality detection processor 104 detects that the control command is abnormal. Thus, it is possible to detect an abnormality of the control command based on the vehicle state in terms of, for example, the current vehicle speed, the steering angle, the shift position, or the like.

In the abnormality detection apparatus according to the present embodiment, the control command is a control command that controls the vehicle 1 to execute at least one of moving forward, making a turn, and stopping. Thus, the abnormality detection apparatus is capable of detecting an abnormality in automated driving or an advanced driver assistance system such as abrupt steering during running, sudden braking, sudden accelerating, jump starting from a stop state, or the like thereby providing a high-security driving environment.

In the abnormality detection apparatus according to the present embodiment, the first communicator 101a receives a first frame which is an E-frame in which data of a CAN frame is put. The second communicator 101b includes the first communicator 101a. Thus, the abnormality detection apparatus receives an E-frame converted from a CAN frame, and thus an abnormality of the CAN frame can be detected at a device on Ethernet (registered trademark).

Second Embodiment

Next, a second embodiment is described. An automated driving DCU 100 functioning as an abnormality detection apparatus according to the second embodiment is similar to the automated driving DCU 100 according to the first embodiment, and thus the following description focuses on differences. The automated driving DCU 100 according to the second embodiment is different from the automated driving DCU 100 according to the first embodiment in that the automated driving DCU 100 according to the second embodiment also detects an abnormality of a CAN frame.

Figure 12:
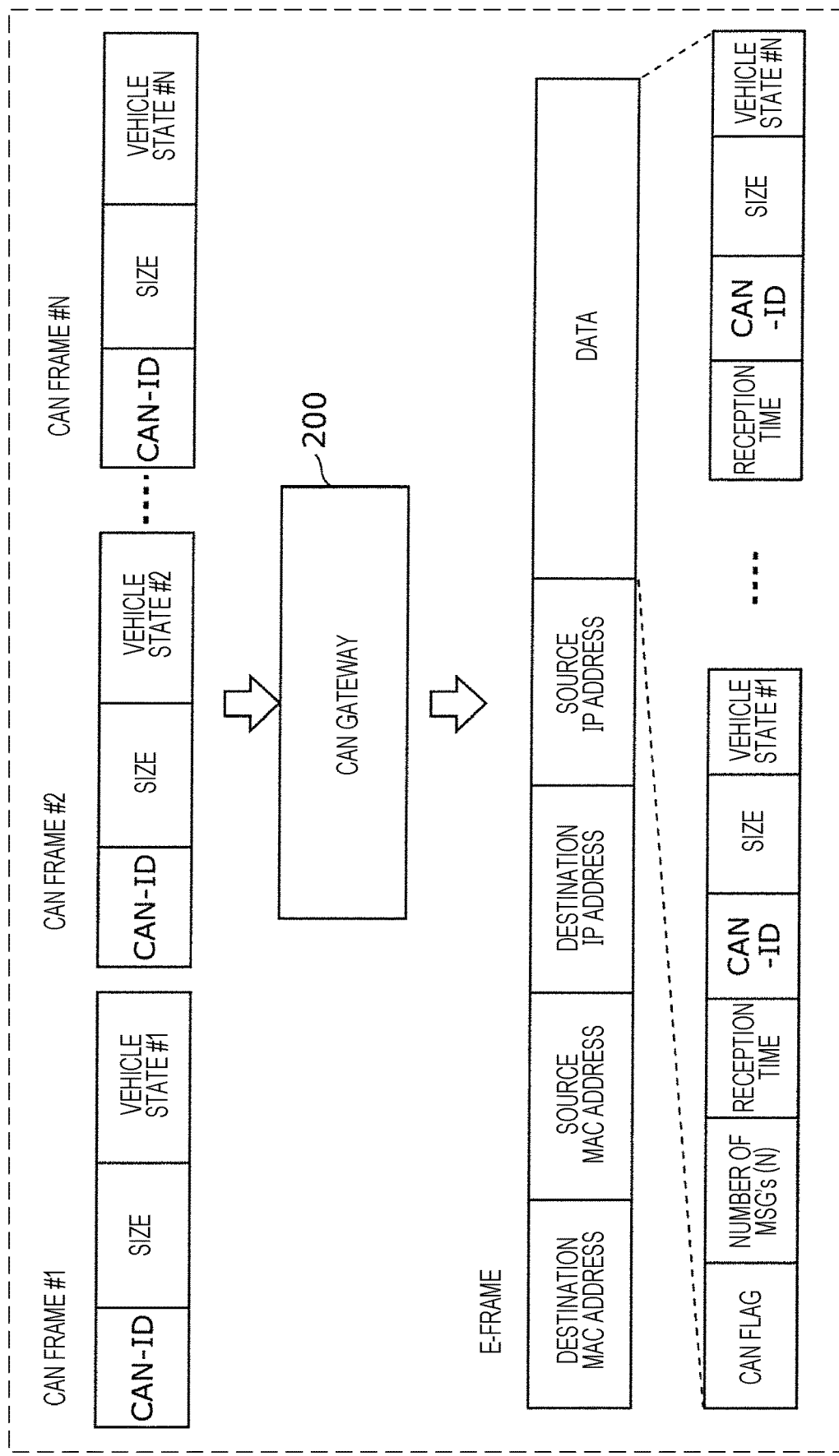
FIG. 12 is a diagram conceptually illustrating a manner in which a CAN gateway transmits an E-frame based on a plurality of received CAN frames according to a second embodiment.

FIG. 12 conceptually illustrates a manner in which a CAN gateway 200 according to the second embodiment transmits an E-frame based on a plurality of received CAN frames.

In the present embodiment, the automated driving DCU 100 detects an abnormality in CAN by checking a CAN frame period. As shown in FIG. 12, the CAN gateway 200 receives a plurality of CAN frames, and adds a reception time of each CAN frame of the received CAN frames. That is, the CAN gateway 200 generates an E-frame by putting the N CAN frames added with reception times in a data field of the E-frame. As in the first embodiment, the CAN gateway 200 generates the E-frame so as to include the state information on the vehicle 1 in terms of the vehicle speed, the steering angle, the shift position and/or the like included in CAN frames.

The E-frame received by the second communicator 101b in the automated driving DCU 100 is configured as shown in FIG. 12, and thus the received E-frame includes, as data, a plurality of CAN frames and reception times indicating times at which the respective CAN frames were received by the device such as the CAN gateway 200.

FIG. 13 is a diagram illustrating an example of an abnormality detection rule stored in the abnormality detection rule storage 105 of the automated driving DCU 100 according to the second embodiment. The abnormality detection rule shown in FIG. 13 is an example of a second rule for detecting whether a CAN frame is abnormal.

As shown in FIG. 13, the second rule indicates an allowable range of CAN frame reception period for CAN frames corresponding to a CAN-ID which is an identifier indicating a type of data of the CAN frame. The second rule may further indicate an amount of change allowed for a CAN frame corresponding to each of a plurality of CAN-IDs as counted from a data value of a CAN frame immediately previous to the current CAN frame. Note that the CAN frame immediately previous to the current CAN frame is a CAN frame having the same CAN-ID and received at a reception time immediately previous to that of the current CAN frame.

More specifically, the second rule is a rule indicating that for a CAN frame whose CAN-ID is "0xA1", the period calculated based on CAN frame reception times described in the E-frame described in FIG. 12 is within a standard period 10 ms±3 ms. That is, the rule indicates that if the difference of the reception time from the reception time of the previous CAN frame is within the standard period 10 ms±3 ms, the period is valid. The second rule may indicate that for a CAN frame with CAN-ID of "0xA1", the amount of change in data from an immediately previous CAN frame is within ±50, the amount of change is valid. For other IDs, allowable period ranges and allowable ranges of amount of change in data are defined.

Note that the amount of change in data value defined in the second rule is the amount of change in a value corresponding to the state information on the vehicle 1, such as the amount of change in a vehicle speed, the amount of change in a steering angle, or the like.

In a case where the second rule is used, the abnormality detection processor 104 of the automated driving DCU 100 detects where a plurality of CAN frames included in an E-frame are abnormal based on a plurality of reception times corresponding to the respective CAN frames obtained from the E-frame received by the second communicator 101b.

More specifically, the abnormality detection processor 104 compares reception times of a plurality of CAN frames having the same identifier such that a first reception time of a first CAN frame is compared with a second reception time of a second CAN frame thereby detecting whether the first CAN frame is abnormal. In a case where the difference of the first reception time from the second reception time is out of the allowable range of the reception period defined in the second rule for the identifier, the abnormality detection processor 104 detects that the first CAN frame is abnormal.

The abnormality detection processor 104 may detect an abnormality such that when the difference of a first data value of a first CAN frame from a second data value of a second CAN frame is greater than an amount of change corresponding to the identifier in the second rule, it is determined that the first CAN frame is abnormal.

In a case where the abnormality detection processor 104 detects that a CAN frame is abnormal, the abnormality detection processor 104 prohibits transferring of a control command. That is, in this case, the abnormality detection processor 104 may prohibit transferring of a control command received at this point of time from the automated driving ECU 110 or may prohibit transferring of control commands received from the automated driving ECU 110 after this point of time.

Next, an operation of the network system 3 installed in the vehicle 1 according to the second embodiment is described below.

Figure 14:
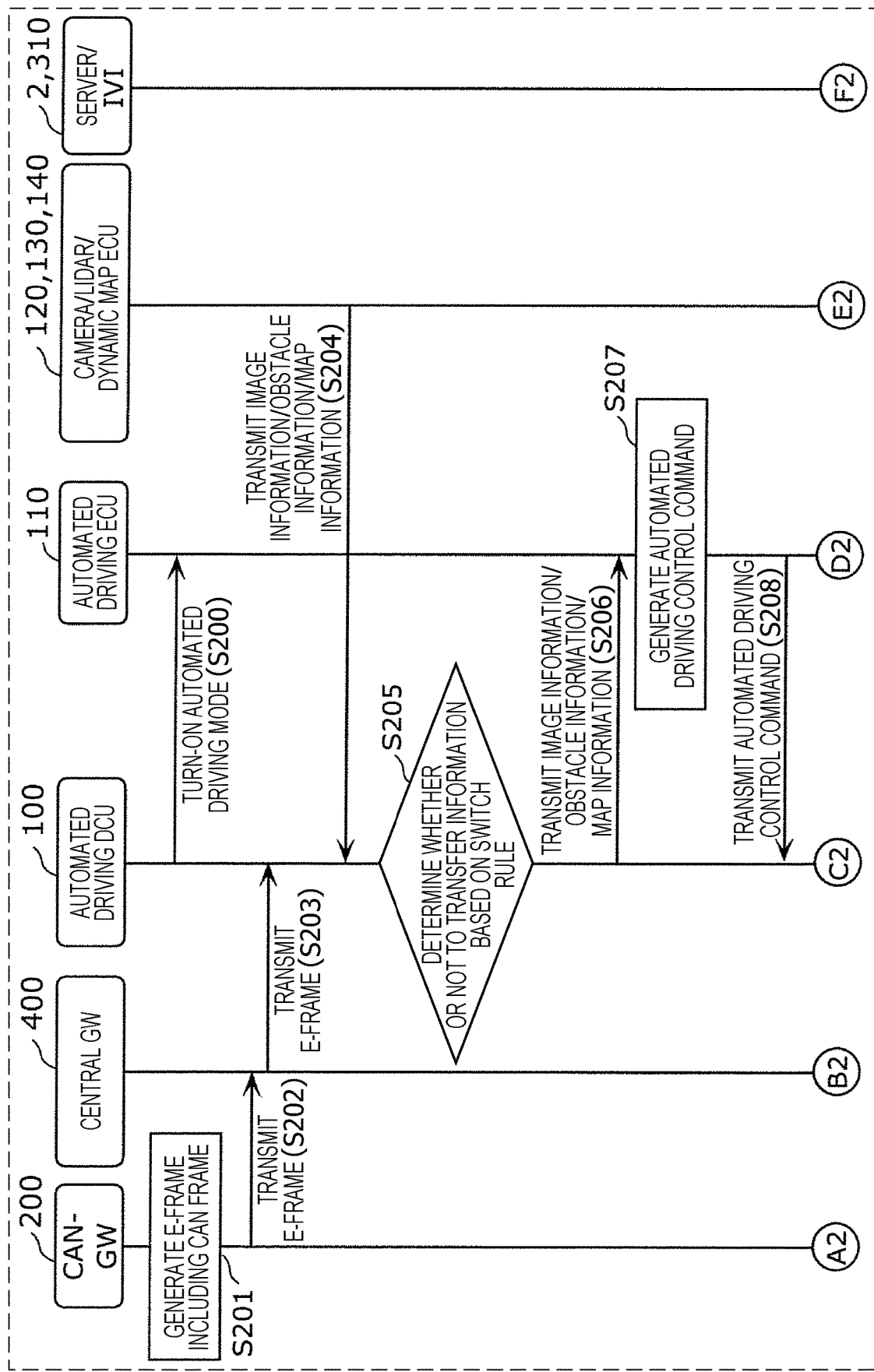
FIG. 14 is a sequence diagram illustrating an example of a method of detecting an abnormality in a network system according to the second embodiment.
Figure 15:
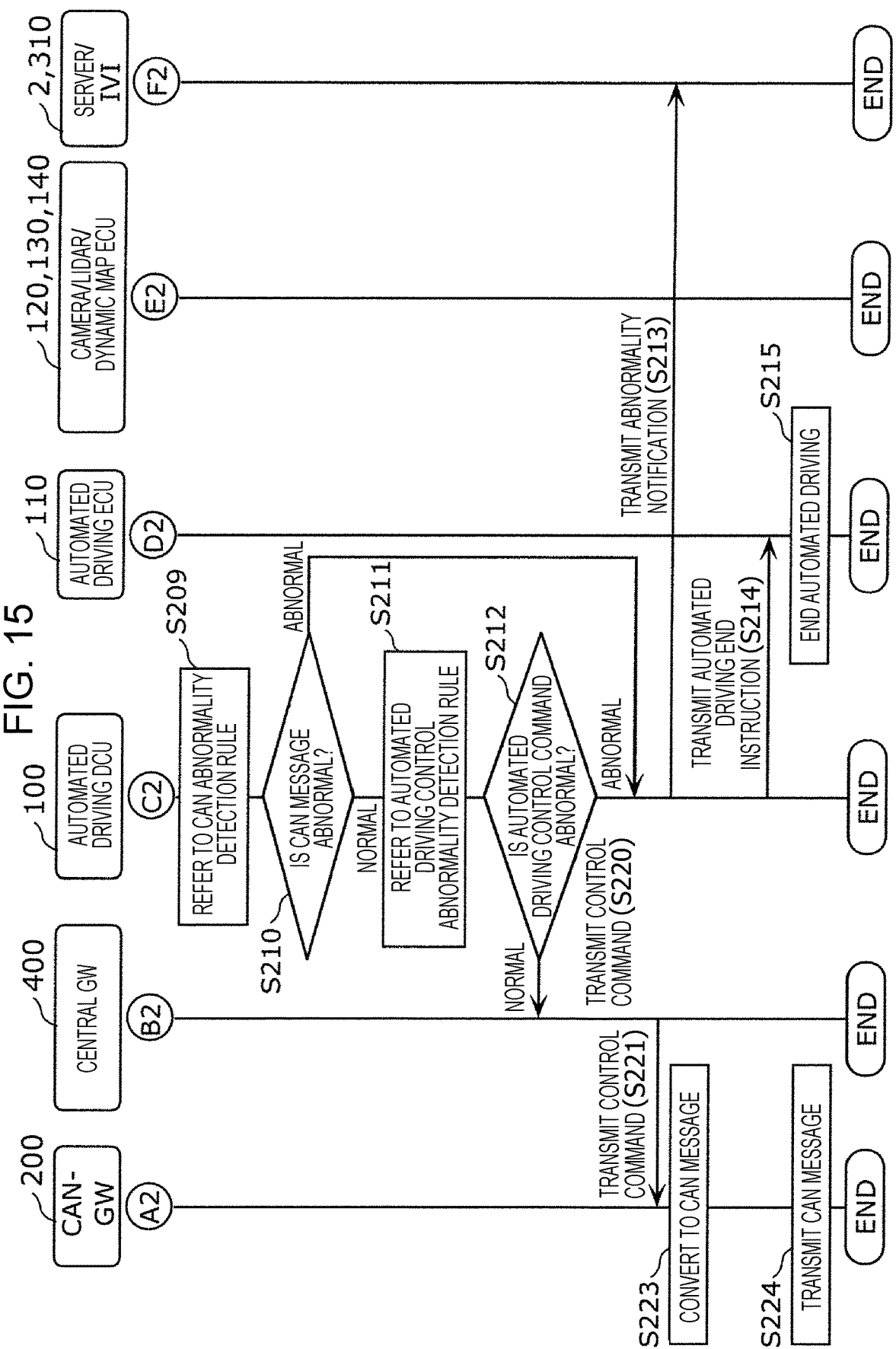
FIG. 15 is a sequence diagram illustrating an example of a method of detecting an abnormality in a network system according to the second embodiment.

FIG. 14 and FIG. 15 are sequence diagrams illustrating an example of an abnormality detection method in the network system 3 according to the second embodiment. In the abnormality detection method according to the second embodiment, in steps S200 to S208, only step S201 is different from step S101 of the abnormality detection method according to the first embodiment in that an E-frame includes a reception time of each CAN frame shown in FIG. 12. However, the other steps, that is, step S200 and steps S202 to S208 are similar to step S100 and steps S102 to S108 of the abnormality detection method according to the first embodiment, and thus a description thereof is omitted.

In the automated driving DCU 100, the abnormality detection processor 104 refers to the abnormality detection rule stored in the abnormality detection rule storage 105. Herein, the second rule shown in FIG. 13 is referred to.

In the automated driving DCU 100, the abnormality detection processor 104 determines whether a CAN frame is abnormal (S210). In a case where the abnormality detection processor 104 determines that a CAN frame is abnormal (abnormal in step S210), the abnormality detection processor 104 transfers the process to step S213. In a case where the abnormality detection processor 104 determines that a CAN frame is normal (normal in step S210), the abnormality detection processor 104 transfers the process to step S211.

In the automated driving DCU 100, when the abnormality detection processor 104 detects an abnormality of a CAN frame, the abnormality detection processor 104 determines that continuing the automated driving may cause a high risk, and the abnormality detection processor 104 issues, via the second communicator 101b, a notification including information indicating that the server 2 or the IVI 310 has an abnormality (S213). Note that in this case, the abnormality detection processor 104 does not transmit a control command to the central gateway 400. That is, in this case, the abnormality detection processor 104 prohibits transferring of the control command determined to be abnormal to the second network 20 via the central gateway 400 and the CAN gateway 200.

Steps S211, S212, S214, and S215 are respectively similar to steps S109, S110, S112, and S113 of the abnormality detection method according to the first embodiment, and thus a description thereof is omitted. Furthermore, steps S221 to S224 are respectively similar to steps S120 to S123 of the abnormality detection method according to the first embodiment, and thus a description thereof is omitted.

In the flow shown, step S212 is performed after step S210. However, step S210 may be performed after step S212.

In the abnormality detection apparatus according to the present embodiment, the abnormality detection rule further includes the second rule for detecting whether a CAN frame is abnormal. In a case where the abnormality detection processor 104 detects that a CAN frame is abnormal, the abnormality detection processor 104 prohibits transferring of a control command. Thus, after the abnormality detection process is performed by the abnormality detection apparatus, it is allowed to execute the control command. That is, after the transmission of the automated driving control command is allowed after the abnormality detection apparatus, which is a device located on the first network 10, confirms that the second network 20 is in a normal state. Thus, even in a case where the second network 20 has a vulnerability and this vulnerability is attacked, the abnormality detection apparatus is capable of preventing the automated driving from being controlled unauthorizedly.

Furthermore, in the abnormality detection apparatus according to the present embodiment, the second rule indicates allowable ranges of CAN frame reception period allowed for CAN frames corresponding to respective CAN-IDs. The second communicator 101b receives an E-frame including, in its data field, a plurality of CAN frames and reception times indicating times at which the respective CAN frames were received by a device on the first network 10. The abnormality detection processor 104 performs an abnormality detection by checking reception times of a plurality of CAN frames having the same identifier based on the reception times corresponding to the respective CAN frames, and if the difference of a first reception time of a first CAN frame from a second reception time of an immediately previous second CAN frame is out of a reception period range associated, in the second rule, with the same identifier, the abnormality detection processor 104 detects that the first CAN frame is abnormal. Thus, in the abnormality detection apparatus, even in a situation in which there is an abnormality on the second network 20, an abnormality of a CAN frame having periodicity can be detected at a device on the first network 10, and it is possible to stop the automated driving.

Furthermore, in the abnormality detection apparatus according to the present embodiment, the second rule further indicates an amount of change allowed for a CAN frame corresponding to each of a plurality of identifiers as counted from a data value of a CAN frame immediately previous to a current CAN frame, and the abnormality detection processor 104 further detects an abnormality such that in a case where a difference of a first data value of a first CAN frame from a second data value of a second CAN frame is greater than the amount of change associated, in the second rule, with the same identifier, the abnormality detection processor detects that the first CAN frame is abnormal. Thus, in the abnormality detection apparatus, even in a situation in which there is an abnormality on the second network 20, an abnormality of a data value of a CAN frame can be detected at a device on the first network 10, and it is possible to stop the automated driving.

Third Embodiment

Next, a third embodiment is described. An automated driving DCU 100 functioning as an abnormality detection apparatus according to the third embodiment is similar to the automated driving DCU according to the second embodiment in that a process of detecting an abnormality of a CAN frame is performed, but different in that an abnormality detection rule can be specified in an E-frame.

Figure 16:
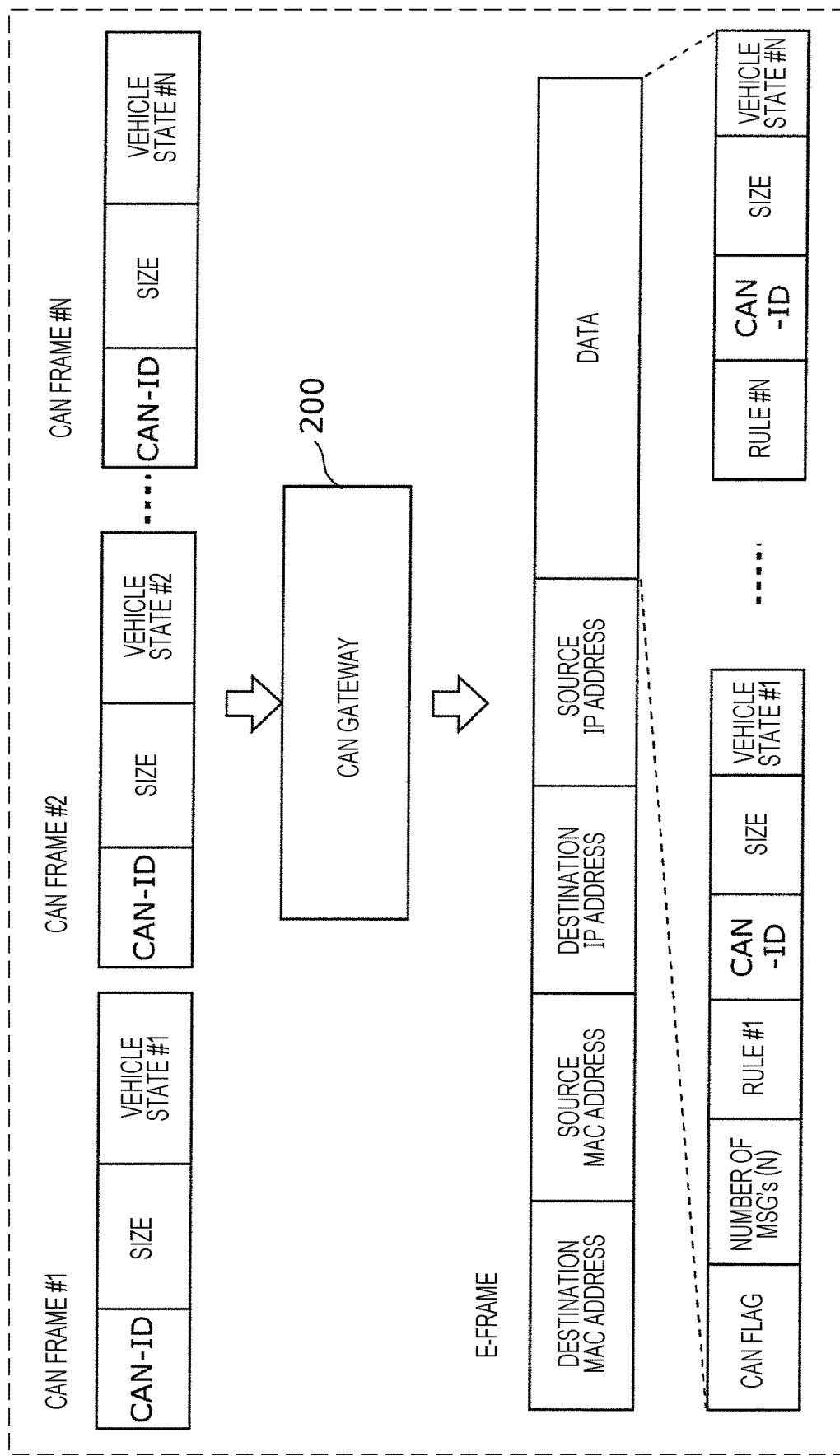
FIG. 16 is a diagram conceptually illustrating a manner in which a CAN gateway transmits an E-frame based on a plurality of received CAN frames according to a third embodiment.

FIG. 16 is a diagram conceptually illustrating a manner in which a CAN gateway 200 transmits an E-frame based on a plurality of received CAN frames according to the third embodiment.

FIG. 17 is a diagram illustrating a table defining a detection rule in detecting a CAN abnormality in an automated driving DCU 100 according to the third embodiment.

As for CAN frames for which a rule #1 is defined in the E-frame shown FIG. 16 as the abnormality detection rule, the abnormality detection processor 104 of the automated driving DCU 100 performs an abnormality detection by checking a CAN frame period for CAN frames having the same CAN-ID. In the case where the rule #1 is specified, the abnormality detection processor 104 performs the abnormality detection according to the second rule using a period calculated from CAN frame reception times described in the second embodiment.

As for CAN frames for which a rule #2 is defined as the detection rule, the abnormality detection processor 104 of the automated driving DCU 100 performs the abnormality detection by checking the CAN frames in terms of the amount of change in a data value. In the case where the rule #2 is specified, the abnormality detection processor 104 performs the abnormality detection according to the second rule using data values of CAN frames described in the second embodiment.

As for CAN frames for which a rule #3 is defined as the detection rule, the abnormality detection processor 104 of the automated driving DCU 100 performs an abnormality detection by checking a message authentication code of each CAN frame. In the case of the rule #3, it is reassumed that the automated driving DCU 100 has acquired in advance a shared MAC key for use in authentication. That is, in this case, if the message authentication code is equal to the MAC key, the abnormality detection processor 104 determines that the CAN frame is valid, but otherwise the abnormality detection processor 104 determines that the CAN frame is abnormal.

As described above, the abnormality detection processor 104 acquires, as the abnormality detection rule, rules associated with respective identifiers. The abnormality detection processor 104 detects that the CAN frame is abnormal based on the abnormality detection rule.

This makes it possible for the abnormality detection apparatus to set a detection rule individually for each CAN frame. For example in a case where a large load is imposed on the second network 20 and thus it is difficult to perform a detection process in the second network 20, the process of detecting an abnormality on the second network 20 can be performed by a device on the first network 10.

The CAN gateway 200 may receive a plurality of CAN frames and may apply, to each of the received CAN frames, an abnormality detection rule associated with a CAN-ID of the CAN frame. The abnormality detection rule applied by the CAN gateway 200 may be, for example, the second rule according to the second embodiment described above with reference to FIG. 13. The CAN gateway 200 may apply a rule, in the second rule, associated with a CAN-ID or may apply all rules in the second rule.

The abnormality detection rule described above with reference to FIG. 17 may be stored in the abnormality detection rule storage 105 of the automated driving DCU 100. In this case, a rule of the abnormality detection rule is associated individually with each CAN-ID.

Other Embodiments

The present disclosure has been described above by way of example with reference to the first to third embodiments. However, the techniques of the present disclosure are not limited to those described above, but modifications, replacements, additions, removals, or the like are possible as required, which also fall within the scope of the present disclosure. Some such examples are described below.

(1) In the embodiments described above, it is assumed by way of example that data frames are transmitted via the in-vehicle network according to the CAN protocol. The CAN protocol may be a generalized CAN protocol including CANOpen used in a system embedded in an automation system, or derivative protocols such as TTCAN (Time-Triggered CAN), CANFD (CAN with Flexible Data Rate) or the like. The in-vehicle network may use a protocol other than the CAN protocol. As for a protocol for an in-vehicle network in which a frame for controlling a vehicle is transmitted, for example, LIN (Local Interconnect Network), MOST (registered trademark) (Media Oriented Systems Transport), FlexRay (registered trademark), Ethernet (registered trademark) or the like may be used. Networks using these protocols may be combined as subnetworks thereby forming an in-vehicle network. The Ethernet (registered trademark) protocol may be a generalized Ethernet (registered trademark) protocol including Ethernet (registered trademark) AVB (Audio Video Bridging) defined in IEEE802.1, or may be a derivative protocol such as Ethernet (registered trademark) TSN (Time Sensitive Networking) defined in Ethernet (registered trademark)/IP (Industrial Protocol), EtherCAT (registered trademark) (Ethernet (registered trademark) for Control Automation Technology) defined in IEEE802.1 or the like. A network bus in the in-vehicle network may a wired communication line realized using, for example, a wire, an optical fiber, or the like. For example, a frame transmission block apparatus 2400 may be connected to a network bus in a network system in which an ECU communicates using one of protocols described above. In this system, when the frame transmission block apparatus 2400 receives a frame, if it is determined, based on management information indicating whether the frame is to be prevented from being transmitted, that the received frame satisfies a predetermined condition, the frame transmission block apparatus 2400 may perform a process of preventing the frame being transmitted.

(2) In the embodiments described above, a data frame in the CAN protocol is described in a standard ID format. However, an extended ID format may be used, and an ID of a data frame may be an extended ID in the extended ID format. The data frame described above may a frame of a type used in a network in which a protocol other than CAN. In this case, an ID identifying the type of the frame corresponds to the ID of the data frame.

(3) In the embodiments described above, an invalid automated driving control command is prevented. However, an abnormality may be detected in an advanced driver assistance system such as a parking assistance system, a lane keep assist system, a collision prevention system, or the like.

(4) In the embodiments described above, when an abnormality is detected, an abnormality notification is sent to the server 2 or the IVI (In-Vehicle Infotainment) 310. In a case where a communication using V2X or V2I is possible and an inter-vehicle communication or a road-to-vehicle communication is available, an abnormality notification may be sent to another vehicle or an infrastructure apparatus. This makes it possible to send an abnormality occurrence notification to another vehicle or a device of a pedestrian located in the outside, which prevents an accident from occurring.

(5) In the embodiments described above, when an abnormality is detected, an abnormality notification is sent to the server 2 or the IVI (In-Vehicle Infotainment) 310. Alternatively, an occurrence of an abnormality may be recorded as a log in a device on the in-vehicle network. In a case where an occurrence of an abnormality is described in a log, a dealer can recognize details of the abnormality by reading the log from via diagnosis port. The log may be periodically transmitted to the server 2. This makes it possible to remotely detect an abnormality of a vehicle.

(6) In the embodiments described above, the CAN gateway generates an E-frame such that a CAN frame indicating state information on the vehicle is stored in a data field of the E-frame. However, formats other than the CAN frame may be used as long as vehicle state information can be identifiably described.

(7) In the embodiments described above, the automated driving DCU 100 is not connected to the second transmission line 21. However, the automated driving DCU may be connected to the second transmission line. In this case, CAN frames flowing on the second transmission line may be read thereby receiving state information on the vehicle. In this case, automated driving control commands may also be transmitted directly to the second transmission line.

(8) In the embodiments described above, the abnormality detection rule for detecting an abnormality of an automated driving control command shown in FIG. 9 and the abnormality detection rule shown in FIG. 13 are described in white lists in which valid conditions are defined. Instead, the third rule may be defined in a black list.

For example, in the second embodiment, instead of defining the second rule in the white list, the third rule may be defined as the abnormality detection rule in the black list.

The third rule may indicate an unallowable range of CAN frame reception period for CAN frames corresponding to a CAN-ID which is an identifier indicating a type of data of the CAN frame. The third rule may further indicate unallowable amounts of change corresponding to the identifiers, the unallowable amounts of change determined from a data value of a CAN frame immediately previous to the current CAN frame.

In a case where the third rule is used, the abnormality detection processor 104 of the automated driving DCU 100 detects where a plurality of CAN frames included in an E-frame are abnormal based on a plurality of reception times corresponding to the respective CAN frames obtained from the E-frame received by the second communicator 101b. More specifically, In a case where the abnormality detection processor 104 compares reception times of a plurality of CAN frames having the same identifier such that a first reception time of a first CAN frame is compared with a second reception time of a second CAN frame thereby detecting whether the first CAN frame is abnormal. In a case where the difference of the first reception time from the second reception time is within the range of the reception period related, in the third rule for the identifier, the abnormality detection processor 104 detects that the first CAN frame is abnormal.

Thus, in the abnormality detection apparatus, even in a situation in which there is an abnormality on the second network 20, an abnormality of a CAN frame having periodicity can be detected at a device on the first network 10, and it is possible to stop the automated driving.

The abnormality detection processor 104 may detect an abnormality such that when the difference of a first data value of the first CAN frame from a second data value of a second CAN frame is within an amount-of-change range associated, in the third rule, with the same identifier, it is determined that the first CAN frame is abnormal.

Thus, in the abnormality detection apparatus, even in a situation in which there is an abnormality on the second network 20, an abnormality of a data value of a CAN frame can be detected at a device on the first network 10, and it is possible to stop the automated driving.

The abnormality detection rule may be defined in a combination of a white list and a black list.

(9) In the embodiments described above, the switch rule shown in FIG. 8, is defined in the white list format in which valid IPs of transmission sources and destinations, valid MAC addresses, and valid port numbers are described. Instead, the switch rule may be defined in a black list. The rules defined as the switch rule may include conditions in terms of a traffic amount, a communication occurrence frequency, a payload amount.

(10) In the embodiments described above, it is assumed by way of example that the frame abnormality detection apparatus is included in the in-vehicle network system installed in a vehicle to perform communication for controlling the vehicle. However, the frame abnormality detection apparatus may be included in a network system for controlling a mobility entity other than the vehicle. That is, the mobility entity may be, for example, a robot, an aircraft, a ship, a machine, a construction machine, a farm machine, a drone and a mobile vehicle.

(11) Each apparatus such as an ECU according to any embodiment described above may further include, in addition to a memory and a process, a hard disk unit, a display unit, a keyboard, a mouse, and/or the like. Each apparatus such as an ECU or the like described above in the embodiments may be implemented by executing a program stored in a memory such that a function of the apparatus is realized by software, or may be implemented by dedicated hardware (a digital circuit or the like) such that a function thereof is achieved without using a program. Functions of the respective elements in each apparatus may be modified.

(12) Part or all of the constituent elements of each apparatus according to the embodiment described above may be implemented in a single system LSI (Large Scale Integration). The system LSI is a super-multifunction LSI produced such that a plurality of parts are integrated on a single chip. More specifically, the system LSI is a computer system including a microprocessor, a ROM, a RAM, and so on. A computer program is stored in the RAM. In the system LSI, the microprocessor operates according to the computer program thereby achieving the function of the system LSI. Each of the constituent elements of each apparatus described above may be integrated separately on a single chip, or part of all of the apparatus may be integrated on a single chip. Although in the above description, the term system LSI is used, it is also called an IC, an LSI, a super LSI, or an ultra LSI depending on the integration density. The method of implementing the integrated circuit is not limited to the LSI, but the integrated circuit may be implemented in the form of a dedicated circuit or a general-purpose processor. The integrated circuit may also be realized using an FPGA (Field Programmable Gate Array) that can be programmed after the manufacture of the LSI or a reconfigurable processor that is allowed to be reconfigured in terms of the connection or the setting of circuit cells in the inside of the LSI. As a matter of course, if a progress of a semiconductor technology or another technology derived therefrom provides a new technology for realizing an integrated circuit which can replace the LSI, functional blocks may be integrated using the new technology. Use of biotechnology is potentially possible.

(13) Part or all of the constituent elements of each apparatus described above may be implemented in the form of an IC card attachable to the apparatus or in the form of a single module. The IC card or the module is a computer system including a microprocessor, a ROM, a RAM, and/or the like. The IC card or the module may include the super-multifunction LSI described above. In the IC card or the module, the microprocessor operates according to the computer program thereby achieving the function of the IC card or the module. The IC card or the module may be configured so as to be resistant against tampering.

(14) In an aspect, the present disclosure may be implemented by a program (a computer program) by which an abnormality detection method is realized on a computer or may provide a digital signal of the computer program. In an aspect, the present disclosure may be implemented by a computer readable storage medium, such as a flexible disk, a hard disk, a CD-ROM disk, an MO disk, a DVD disk, a DVD-ROM disk, a DVD-RAM disk, a BD (Blu-ray (registered trademark) Disc), a semiconductor memory, or the like in which the computer program or the digital signal are stored. In an aspect, the present disclosure may be implemented by a digital signal stored on such a storage medium. In an aspect, the present disclosure may be implemented by transmitting a computer program or a digital signal via a telecommunication line, a wired or wireless communication line, a network typified by the Internet, data broadcasting, or the like. In an aspect, the present disclosure may be implemented by a computer system including a microprocessor and a memory, wherein the computer program is stored in the memory and the microprocessor operates according to the computer program. The program or the digital signal may be stored in a storage medium, and the storage medium may be transported, or the program or the digital signal may be transferred via the network or the like thereby allowing the present disclosure to be implemented in another separate computer system.

(15) Any embodiment realized by an arbitrary combination of constituent elements and functions disclosed above in the embodiments and modifications also falls in the scope of the present disclosure.

INDUSTRIAL APPLICABILITY

The abnormality detection apparatus and the abnormality detection method according to the present disclosure are useful in effectively detecting an abnormality.

What is claimed is:
1. An abnormality detection apparatus for a mobility entity and for detecting an abnormality in a network system, the network system including a first network and a second network that use different communication protocols, the abnormality detection apparatus comprising:

a first communication circuit that receives state information indicating a state of the mobility entity, the state information being acquired from the second network;
a second communication circuit that transmits and receives a first frame according to a communication protocol used in the first network;
a memory that stores an abnormality detection rule; and
a processor that, in operation, performs operations including:
  detecting, based on the state information and the abnormality detection rule, whether a control command included in the first frame received by the second communication circuit is abnormal, and
  in a case where the processor detects that the control command is abnormal, prohibiting the control command from being transmitted,
wherein the abnormality detection rule associates the control command with a plurality of states of the mobility entity, and
the processor detects that the control command is abnormal in response to the state of the mobility entity, which is received by the first communication circuit, not being one of the plurality of states, which is associated with the control command.

2. The abnormality detection apparatus according to claim 1, wherein
the abnormality detection rule includes a first rule indicating a control command allowed in each of a plurality of different states of the mobility entity, and
the operations further include:
  in a second case where the state of the mobility entity indicated by the state information is not included in any one of the plurality of states, for which the first rule indicates the allowed control command, detecting that the control command is abnormal.

3. The abnormality detection apparatus according to claim 1, wherein the control command causes the mobility entity to execute at least one of moving forward, turning, and stopping.

4. The abnormality detection apparatus according to claim 1, wherein
the first network is according to Ethernet protocol,
the second network is according to CAN protocol,
the first communication circuit receives the state information by receiving a CAN frame including the state information,
the abnormality detection rule includes a first rule for detecting whether the CAN frame is abnormal, and
the operations further include:
  in a second case where the processor detects that the CAN frame is abnormal, prohibiting the control command from being transmitted.

5. The abnormality detection apparatus according to claim 1, wherein
the first network is according to Ethernet protocol,
the second network is according to CAN protocol, and
the first communication circuit receives an Ethernet frame in which a CAN frame indicating the state information is included.

6. The abnormality detection apparatus according to claim 5, wherein
the Ethernet frame includes a plurality of CAN frames, the plurality of CAN frames including the CAN frame indicating the state information,
the abnormality detection rule includes a first rule for detecting whether each of the plurality of CAN frames is abnormal,
the plurality of CAN frames includes identifiers that are different depending on frame type,
the first rule indicates allowable CAN frame reception period ranges corresponding to the identifiers, and
the operations further include:
  detecting an abnormality based on reception times corresponding to CAN frames having a same identifier such that, in a second case where a difference between a first reception time of a first CAN frame of the plurality of CAN frames and a second reception time of a second CAN frame of the plurality of CAN frames received one frame before the first CAN frame is out of an associated allowable CAN frame reception period range indicated by the first rule, the first CAN frame is abnormal.

7. The abnormality detection apparatus according to claim 6, wherein
the first rule further indicates allowable amounts of change corresponding to the identifiers, the allowable amounts of change determined from a data value of a CAN frame immediately previous to a current CAN frame, and
the operations further include:
  detecting an abnormality such that, in a third case where a difference of a first data value of the first CAN frame from a second data value of the second CAN frame is greater than an associated allowable amount of change indicated by the first rule, the first CAN frame is abnormal.

8. The abnormality detection apparatus according to claim 6, wherein
the operations further include:
acquiring, as the abnormality detection rule, rules associated with the identifiers, and
detecting that the CAN frame that indicates the state information is abnormal based on the abnormality detection rule.

9. The abnormality detection apparatus according to claim 5, wherein
the Ethernet frame includes a plurality of CAN frames, the plurality of CAN frames including the CAN frame indicating the state information,
the abnormality detection rule includes a first rule for detecting whether each of the plurality of CAN frames is abnormal,
the plurality of CAN frames includes identifiers that are different depending on frame type,
the first rule indicates unallowable CAN frame reception period ranges corresponding to the identifiers, and
the operations further include:
  detecting an abnormality based on reception times corresponding to CAN frames having a same identifier such that, in a second case where a difference between a first reception time of a first CAN frame of the plurality of CAN frames and a second reception time of a second CAN frame of the plurality of CAN frames received one frame before the first CAN frame is within an associated unallowable CAN frame reception period range indicated by the first rule, the first CAN frame is abnormal.

10. The abnormality detection apparatus according to claim 9, wherein
the first rule further indicates unallowable amounts of change corresponding to the identifiers, the unallowable amounts of change determined from a data value of a CAN frame immediately previous to a current CAN frame, and the operations further include:
- detecting an abnormality such that, in a third case where a difference of a first data value of the first CAN frame from a second data value of the second CAN frame is within an associated unallowable amount of change indicated by the first rule, the first CAN frame is abnormal.

11. An abnormality detection method for an abnormality detection apparatus that is configured to be in a mobility entity for detecting an abnormality in a network system, the network system including a first network and a second network that use different communication protocols, the abnormality detection method comprising:
- receiving state information indicating a state of the mobility entity, the state information being acquired from the second network;
- transmitting and receiving a first frame using a communication protocol of the first network;
- detecting, based on the state information and an abnormality detection rule stored in a memory included in the abnormality detection apparatus, whether a control command included in the received first frame is abnormal; and
- in a case where the control command is abnormal, prohibiting the control command from being transmitted, wherein the abnormality detection rule associates the control command with a plurality of states of the mobility entity, and the control command is detected to be abnormal in response to the state of the mobility entity, which is received by the receiving, not being one of the plurality of states, which is associated with the control command.

* * * * *